(12) United States Patent
Sato et al.

(10) Patent No.: US 12,049,569 B2
(45) Date of Patent: Jul. 30, 2024

(54) COLORED RESIN PARTICLE DISPERSION, INK, INK SET, AND INKJET PRINTING METHOD

(71) Applicant: FUJIFILM Corporation, Tokyo (JP)

(72) Inventors: Noriaki Sato, Kanagawa (JP); Shota Suzuki, Kanagawa (JP); Naoka Hamada, Kanagawa (JP); Ryoichi Nakano, Kanagawa (JP); Masao Ikoshi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 427 days.

(21) Appl. No.: 17/378,762

(22) Filed: Jul. 18, 2021

(65) Prior Publication Data

US 2021/0340399 A1 Nov. 4, 2021

Related U.S. Application Data

(63) Continuation of application No. PCT/JP2019/045642, filed on Nov. 21, 2019.

(30) Foreign Application Priority Data

Feb. 28, 2019 (JP) .................... 2019-035264

(51) Int. Cl.
*C09D 11/54* (2014.01)
*B41J 2/21* (2006.01)
(Continued)

(52) U.S. Cl.
CPC ............. *C09D 11/54* (2013.01); *B41J 2/2107* (2013.01); *B41M 5/0023* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106
See application file for complete search history.

(56) References Cited

U.S. PATENT DOCUMENTS

| | | |
|---|---|---|
| 6,034,154 A | 3/2000 | Kase et al. |
| 6,632,858 B1 | 10/2003 | Pears et al. |

(Continued)

FOREIGN PATENT DOCUMENTS

| | | |
|---|---|---|
| EP | 1174477 | 1/2002 |
| EP | 2641943 | 9/2013 |

(Continued)

OTHER PUBLICATIONS

"International Search Report (Form PCT/ISA/210) of PCT/JP2019/045642," mailed on Dec. 24, 2019, with English translation thereof, pp. 1-5.

(Continued)

*Primary Examiner* — Manish S Shah
(74) *Attorney, Agent, or Firm* — JCIPRNET

(57) ABSTRACT

A colored resin particle dispersion containing colored resin particles and water, in which the colored resin particles contain an oil-soluble dye and a polymer P containing a structural unit represented by Formula (1), a structural unit represented by Formula (2), and a hydrophilic group, an ink, an ink set, and an inkjet printing method. $L^1$ represents a chain hydrocarbon group having 4 to 10 carbon atoms, two *1's each represent a bonding position, $L^2$ represents a chain hydrocarbon group having 2 to 25 carbon atoms which may contain an oxygen atom or the like, or a polymer chain having a number-average molecular weight of 500 or greater, $Y^1$ and $Y^2$ each independently represent —O—, —S—, or, —NRz-, Rz represents a hydrogen atom or a hydrocarbon group having 1 to 20 carbon atoms, and two *2's each represent a bonding position.

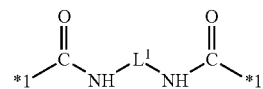

(1)

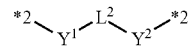

(2)

20 Claims, No Drawings

(51) Int. Cl.

| | | |
|---|---|---|
| *B41M 5/00* | (2006.01) | |
| *C09D 11/033* | (2014.01) | |
| *C09D 11/037* | (2014.01) | |
| *C09D 11/102* | (2014.01) | |
| *C09D 11/328* | (2014.01) | |
| *D06P 1/18* | (2006.01) | |
| *D06P 1/52* | (2006.01) | |
| *D06P 3/60* | (2006.01) | |
| *D06P 5/20* | (2006.01) | |
| *D06P 5/30* | (2006.01) | |

(52) U.S. Cl.
CPC .......... *C09D 11/033* (2013.01); *C09D 11/037* (2013.01); *C09D 11/102* (2013.01); *C09D 11/328* (2013.01); *D06P 1/18* (2013.01); *D06P 1/5285* (2013.01); *D06P 5/2077* (2013.01); *D06P 5/30* (2013.01); *D06P 3/6041* (2013.01)

(56) References Cited

U.S. PATENT DOCUMENTS

| | | | | |
|---|---|---|---|---|
| 2010/0302330 A1* | 12/2010 | Uozumi | ............... | B41M 7/0081 |
| | | | | 347/102 |
| 2011/0184123 A1* | 7/2011 | Itoya | .................. | C08G 18/4854 |
| | | | | 524/591 |
| 2012/0147108 A1* | 6/2012 | Ganapathiappan | .. | C09D 11/322 |
| | | | | 347/102 |
| 2015/0353746 A1* | 12/2015 | Tanaka | ................. | C09D 175/12 |
| | | | | 524/590 |
| 2019/0169453 A1* | 6/2019 | Sato | ..................... | C08G 18/381 |
| 2020/0115576 A1 | 4/2020 | Kodama et al. | | |

FOREIGN PATENT DOCUMENTS

| | | | |
|---|---|---|---|
| EP | 3281992 | 2/2018 | |
| JP | H08218015 | 8/1996 | |
| JP | 2002509957 | 4/2002 | |
| JP | 2008255241 | 10/2008 | |
| JP | 2009235028 | 10/2009 | |
| JP | 4971784 | 7/2012 | |
| JP | 5152620 | 2/2013 | |
| JP | 2016160341 | 9/2016 | |
| JP | 2017171907 | 9/2017 | |
| JP | 2018150401 | 9/2018 | |
| WO | 2016163291 | 10/2016 | |
| WO | WO-2018042916 A1 * | 3/2018 | .......... C09D 11/322 |
| WO | 2019004327 | 1/2019 | |

OTHER PUBLICATIONS

"Written Opinion of the International Searching Authority (Form PCT/ISA/237)" of PCT/JP2019/045642, mailed on Dec. 24, 2019, with English translation thereof, pp. 1-7.
"Search Report of Europe Counterpart Application", issued on Mar. 21, 2022, p. 1-p. 7.
"Office Action of China Counterpart Application", issued on Sep. 19, 2022, with English translation thereof, pp. 1-19.
"Office Action of Japan Counterpart Application", issued on Jan. 10, 2023, with English translation thereof, pp. 1-5.
"Decision of Refusal of China Counterpart Application", issued on Jan. 18, 2023, with English translation thereof, p. 1-p. 18.
Office Action of China Counterpart Application, with English translation thereof, issued on May 20, 2022, pp. 1-19.
"Office Action of Japan Counterpart Application" with English translation thereof, issued on Jul. 5, 2022, p. 1-p. 5.
"Office Action of India Counterpart Application" issued on Oct. 27, 2021, p. 1-p. 7.
"Office Action of India Counterpart Application", issued on Sep. 26, 2023, p. 1-p. 3.

* cited by examiner

COLORED RESIN PARTICLE DISPERSION, INK, INK SET, AND INKJET PRINTING METHOD

CROSS-REFERENCE TO RELATED APPLICATIONS

This application is a continuation application of International Application No. PCT/JP2019/045642, filed on Nov. 21, 2019, the disclosure of which is incorporated herein by reference in its entirety. Further, this application claims priority from Japanese Patent Application No. 2019-035264, filed on Feb. 28, 2019, the disclosure of which is incorporated herein by reference in its entirety.

BACKGROUND OF THE INVENTION

1. Field of the Invention

The present disclosure relates to a colored resin particle dispersion, an ink, an ink set, and an inkjet printing method.

2. Description of the Related Art

Various studies have been conducted on techniques for forming an image by an inkjet method. In recent years, images have also been formed on a fabric by an inkjet method. In this aspect, the image formation is referred to as inkjet printing.

For example, JP2016-160341A discloses, as an ink set capable of performing high quality of opal finishing on cloth (fabric) including at least two types of fibers and of coloring the fabric while a pattern and a watermark to be applied are less restricted in design, an ink set for performing opal finishing and coloring on a fabric including a first fiber and a second fiber by an inkjet method, which includes: an etching ink containing an etching agent which can leach the first fiber and cannot leach the second fiber; and a pigment ink containing a pigment which can dye the first fiber and the second fiber.

JP2018-150401A discloses, as an ink composition for inkjet printing which has excellent storage stability and continuous printing stability, does not impose a burden on a head by maintenance of wiping with a solidified ink, is friendly to printing environment and a printer apparatus, and can obtain a good printed article, an ink composition for inkjet printing containing (A) an organic acid having a lactone structure in which one or more hydroxyl groups are converted into alkali chloride in an organic acid having a lactone structure having the hydroxyl group as a substituent, (B) a coloring agent, (C) a styrene-(meth)acrylic copolymer, (D) glycerin, and (E) an urethane resin.

SUMMARY OF THE INVENTION

However, the image formed on the fabric may be required to have further improved optical density and rub resistance.

An object to be solved by an aspect of the present disclosure is to provide a colored resin particle dispersion, an ink, an ink set, and an inkjet printing method capable of forming an image having excellent optical density and rub resistance on a fabric.

Specifically, the following aspects are included in order to achieve the object.

<1> A colored resin particle dispersion comprising: colored resin particles; and water, in which the colored resin particles contain an oil-soluble dye and a polymer P containing a structural unit represented by Formula (1), a structural unit represented by Formula (2), and a hydrophilic group.

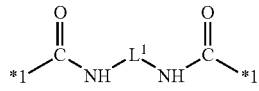

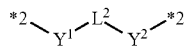

In Formula (1),
$L^1$ represents a chain hydrocarbon group having 4 to 10 carbon atoms, and
two *1's each represent a bonding position.
In Formula (2),
$L^2$ represents a chain hydrocarbon group having 2 to 25 carbon atoms which may contain an oxygen atom, a nitrogen atom, or a sulfur atom, or a polymer chain having a number-average molecular weight of 500 or greater which consists of a polyether chain, a polyester chain, a polycaprolactone chain, a polycarbonate chain, a polybutadiene chain, a polyisoprene chain, or a polyolefin chain,
$Y^1$ and $Y^2$ each independently represent —O—, —S—, or —NRz-, Rz represents a hydrogen atom or a hydrocarbon group having 1 to 20 carbon atoms, and
two *2's each represent a bonding position.
<2> The colored resin particle dispersion according to <1>, in which a glass transition temperature of the polymer P is 50° C. or lower.
<3> The colored resin particle dispersion according to <1> or <2>, in which $L^2$ is a chain hydrocarbon group having 4 to 25 carbon atoms and a branched structure which may contain an oxygen atom, a nitrogen atom, or a sulfur atom, or a polymer chain having a number-average molecular weight of 500 or greater which consists of a polycarbonate chain.
<4> The colored resin particle dispersion according to <3>, in which the chain hydrocarbon group having 4 to 25 carbon atoms and a branched structure which may contain an oxygen atom, a nitrogen atom, or a sulfur atom is an unsubstituted branched alkylene group having 6 to 25 carbon atoms, an alkoxylated branched alkylene group having 6 to 25 carbon atoms, or an alkylcarbonyloxylated branched alkylene group having 6 to 25 carbon atoms, and
the polycarbonate chain contains an alkylene group having 2 to 12 carbon atoms and does not contain a cyclic structure.
<5> The colored resin particle dispersion according to any one of <1> to <4>, in which $L^1$ is an alkylene group having 6 to 10 carbon atoms.
<6> The colored resin particle dispersion according to any one of <1> to <5>, in which the hydrophilic group is at least one selected from the group consisting of a carboxyl group and a salt of the carboxyl group.
<7> The colored resin particle dispersion according to <6>, in which in a case where a total number of millimoles of a carboxyl group contained in 1 g of the polymer P and a salt of the carboxyl group is defined as an acid value of the polymer P, the acid value of the polymer P is 0.30 mmol/g to 1.50 mmol/g.

<8> The colored resin particle dispersion according to any one of <1> to <7>, in which a weight-average molecular weight of the polymer P is 8,000 to 30,000.

<9> The colored resin particle dispersion according to any one of <1> to <8>, in which the oil-soluble dye contains at least one selected from the group consisting of a metal complex dye and a disazo dye.

<10> The colored resin particle dispersion according to any one of <1> to <9>, in which the oil-soluble dye contains at least one selected from the group consisting of a chromium complex dye and a disazo dye.

<11> The colored resin particle dispersion according to any one of <1> to <10>, in which the oil-soluble dye contains a chromium complex dye.

<12> The colored resin particle dispersion according to any one of <1> to <11>, in which a mass ratio of a content of the polymer P to a content of the oil-soluble dye is 0.10 to 2.50.

<13> The colored resin particle dispersion according to any one of <1> to <12>, in which a mass ratio of a content of the polymer P to a content of the oil-soluble dye is 0.25 to 1.00.

<14> An ink comprising: the colored resin particle dispersion according to any one of <1> to <13>.

<15> The ink according to <14>, which is used as an inkjet ink.

<16> The ink according to <14> or <15>, which is used as a printing ink.

<17> An ink set comprising: two or more types of inks, in which at least one of the two or more types of inks is the ink according to any one of <14> to <16>.

<18> An inkjet printing method comprising: a step of forming an image by applying the ink according to any one of <14> to <16> to a fabric by an inkjet method; and a step of heat-treating the image.

According to an aspect of the present disclosure, a colored resin particle dispersion, an ink, an ink set, and an inkjet printing method capable of forming an image having excellent optical density and rub resistance on a fabric are provided.

DESCRIPTION OF THE PREFERRED EMBODIMENTS

In the present disclosure, a numerical range expressed using "to" represents a range including numerical values before and after "to" as a minimum value and a maximum value.

In the present disclosure, regarding the amount of each component in a composition, in a case where there are a plurality of substances corresponding to the component in the composition, the amount means a total amount of the plurality of substances present in the composition, unless otherwise specified.

In numerical ranges described stepwise in the present disclosure, an upper limit or a lower limit described in a numerical range may be substituted with an upper limit or a lower limit of another numerical range described stepwise, or may be substituted with a value shown in examples.

In the present disclosure, the term "step" includes not only an independent step but also cases where it cannot be clearly distinguished from other steps, so long as the desired effect of the step can be achieved.

In the present disclosure, the "image" means a film as a whole (including a coating film) formed using a colored resin particle dispersion or an ink.

In the present disclosure, the concept of the "image" also includes a solid image.

[Colored Resin Particle Dispersion]

A colored resin particle dispersion according to the embodiment of the present disclosure contains
colored resin particles and water, and
the colored resin particles contain an oil-soluble dye and a polymer P containing a structural unit represented by Formula (1), a structural unit represented by Formula (2), and a hydrophilic group.

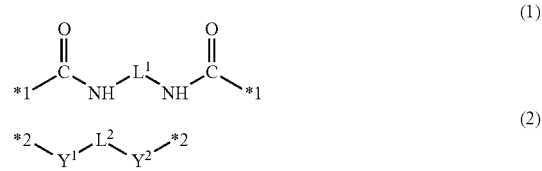

In Formula (1),
$L^1$ represents a chain hydrocarbon group having 4 to 10 carbon atoms, and
two *1's each represent a bonding position.
In Formula (2),
$L^2$ represents a chain hydrocarbon group having 2 to 25 carbon atoms which may contain an oxygen atom, a nitrogen atom, or a sulfur atom, or a polymer chain having a number-average molecular weight of 500 or greater which consists of a polyether chain, a polyester chain, a polycaprolactone chain, a polycarbonate chain, a polybutadiene chain, a polyisoprene chain, or a polyolefin chain,
$Y^1$ and $Y^2$ each independently represent —O—, —S—, or, —NRz-,
Rz represents a hydrogen atom or a hydrocarbon group having 1 to 20 carbon atoms, and
two *2's each represent a bonding position.

With the colored resin particle dispersion according to the embodiment of the present disclosure, an image having excellent optical density and rub resistance can be formed on a fabric.

The reason why such an effect is obtained is presumed as follows.

In the colored resin particle dispersion according to the embodiment of the present disclosure, the polymer P in the colored resin particles has a chain structure (see $L^1$ and $L^2$ described above). It is thought that a glass transition temperature (Tg) of the polymer P is lowered to some extent (for example, 60° C. or lower) due to such a structure. In addition, it is thought that since the polymer P has a hydrophobic skeleton containing the structural unit represented by Formula (1) and the structural unit represented by Formula (2), the polymer P has a high affinity for the oil-soluble dye.

Accordingly, it is thought that in a case where the colored resin particle dispersion according to the embodiment of the present disclosure or an ink containing the colored resin particle dispersion according to the embodiment of the present disclosure is applied to a fabric to form an image and the formed image is heat-treated, the colored resin particles easily permeate into the fabric due to the action of the polymer P having a low Tg and a high affinity for the oil-soluble dye.

Accordingly, it is thought that the optical density (in other words, dyeability on the fabric) of the image is increased, and the rub resistance of the image is also improved.

For the above reasons, the colored resin particle dispersion according to the embodiment of the present disclosure is suitable for use in image formation on a fabric.

However, a base material to be subjected to image formation is not limited to the fabric, and another base material such as a plastic base material may be used.

For example, in a case where the colored resin particle dispersion according to the embodiment of the present disclosure or an ink containing the colored resin particle dispersion according to the embodiment of the present disclosure is applied to a plastic base material to form an image and the formed image is heat-treated, an image having excellent optical density, hardness, and adhesiveness to the plastic base material can be formed on the plastic base material.

It is thought that the reason why such an effect is obtained is that the film-forming property of the image by the heat treatment is increased by the action of the polymer P having a low Tg.

The hydrophilic group of the polymer P contributes to the dispersion stability of the colored resin particles in the colored resin particle dispersion.

In addition, the dispersion stability contributes to the jetting property of the ink containing the colored resin particle dispersion from an inkjet head (hereinafter, also simply referred to as "jetting property") and the storage stability of the ink.

In examples to be described later, the jetting property and the storage stability of the ink were evaluated as an indicator of the dispersion stability of the colored resin particles in the colored resin particle dispersion.

<Water>

The colored resin particle dispersion according to the embodiment of the present disclosure contains water.

That is, the colored resin particle dispersion according to the embodiment of the present disclosure is an aqueous dispersion of the colored resin particles.

The water content of the colored resin particle dispersion according to the embodiment of the present disclosure is, for example, 40 mass % or greater, preferably 50 mass % or greater, and even more preferably 60 mass % or greater with respect to the total amount of the colored resin particle dispersion.

The upper limit of the water content depends on the amount of the solids such as the colored resin particles, and is, for example, 90 mass % with respect to the total amount of the colored resin particle dispersion.

<Colored Resin Particles>

The colored resin particle dispersion according to the embodiment of the present disclosure contains at least one type of colored resin particles.

The colored resin particles contain at least one type of oil-soluble dye and at least one type of polymer P.

(Polymer P)

—Structural Unit Represented by Formula (1)—

The polymer P contains at least one type of structural unit represented by Formula (1) (hereinafter, also referred to as "unit (1)").

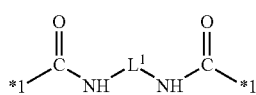

(1)

In Formula (1), $L^1$ represents a chain hydrocarbon group having 4 to 10 carbon atoms, and two *1's each represent a bonding position.

The unit (1) is preferably bonded to at least a structural unit represented by Formula (2) (hereinafter, also referred to as "unit (2)").

Examples of the chain hydrocarbon group represented by $L^1$ include a linear alkylene group, a branched alkylene group, a linear alkenylene group, a branched alkenylene group, a linear alkynylene group, and a branched alkynylene group.

The chain hydrocarbon group represented by $L^1$ is preferably a linear alkylene group or a branched alkylene group.

The number of carbon atoms of the chain hydrocarbon group represented by $L^1$ is 4 to 10. From the viewpoint of an improvement in the optical density and rub resistance of the image, the number of carbon atoms is preferably 6 to 10.

From the viewpoint of an improvement in the optical density and rub resistance of the image, $L^1$ is particularly preferably an alkylene group having 6 to 10 carbon atoms (that is, a linear alkylene group or a branched alkylene group).

Examples of the compound for forming the unit (1) (hereinafter, also referred to as "compound for forming a unit (1)") include a diisocyanate compound having a structure in which each of two "—NH(C=O)-*1" sites in the unit (1) is replaced with an isocyanate group (—NCO group).

Specific examples of the compound for forming a unit (1) will be shown below.

The compound for forming a unit (1) is not limited to the following specific examples.

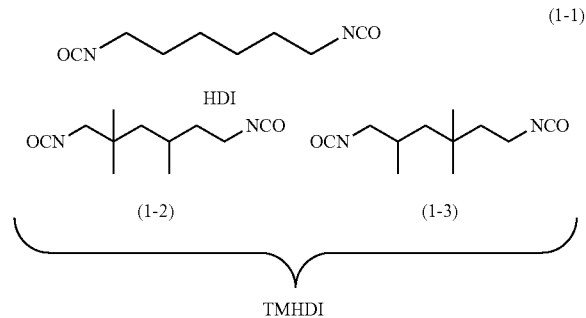

The compound (1-1) is hexamethylene diisocyanate (HDI).

Both the compounds (1-2) and (1-3) are trimethylhexamethylene diisocyanate (TMHDI). The compounds (1-2) and (1-3) are in an isomer relationship. As TMHDI, a mixture of the compounds (1-2) and (1-3) may be used.

—Structural Unit Represented by Formula (2)—

The polymer P contains at least one type of structural unit represented by Formula (2) (that is, unit (2)).

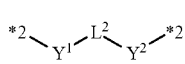

(2)

In Formula (2), $L^2$ represents a chain hydrocarbon group having 2 to 25 carbon atoms which may contain an oxygen atom, a nitrogen atom, or a sulfur atom, or a polymer chain having a number-average molecular weight of 500 or greater which consists of a polyether chain, a polyester chain, a polycaprolactone chain, a polycarbonate chain, a polybutadiene chain, a polyisoprene chain, or a polyolefin chain, $Y^1$ and $Y^2$ each independently represent —O—, —S—, or, —NRz-, Rz represents a hydrogen atom or a hydrocarbon group having 1 to 20 carbon atoms, and two *2's each represent a bonding position.

Here, the chain hydrocarbon group having 2 to 25 carbon atoms which contains an oxygen atom, a nitrogen atom, or a sulfur atom, included in the concept of the "chain hydrocarbon group having 2 to 25 carbon atoms which may contain an oxygen atom, a nitrogen atom, or a sulfur atom, means an organic group having 2 to 25 carbon atoms which has a structure in which at least one carbon atom in the chain hydrocarbon group is replaced with an oxygen atom, a nitrogen atom, or a sulfur atom.

The chain hydrocarbon group having 2 to 25 carbon atoms which may contain an oxygen atom, a nitrogen atom, or a sulfur atom, represented by $L^2$, (hereinafter, also simply referred to as "chain hydrocarbon group represented by $L^2$") is preferably an unsubstituted or substituted alkylene group.

Examples of the substituent in the substituted alkylene group include an alkoxy group, an alkylcarbonyloxy group, an alkylthio group, an amino group, a monoalkylamino group, and a dialkylamino group.

The unit (2) is preferably bonded to at least the unit (1).

The number of carbon atoms of the chain hydrocarbon group represented by $L^2$ in Formula (2) is preferably 4 to 25, and more preferably 6 to 25 from the viewpoint of an improvement in the optical density and rub resistance of the image.

From the viewpoint of an improvement in the optical density and rub resistance of the image, the chain hydrocarbon group represented by $L^2$ is preferably a chain hydrocarbon group having 4 to 25 carbon atoms and a branched structure which may contain an oxygen atom, a nitrogen atom, or a sulfur atom, and more preferably an unsubstituted branched alkylene group having 6 to 25 carbon atoms, an alkoxylated branched alkylene group having 6 to 25 carbon atoms (that is, a branched alkylene group substituted with an alkoxy group), or an alkylcarbonyloxylated branched alkylene group having 6 to 25 carbon atoms (that is, a branched alkylene group substituted with an alkylcarbonyloxy group).

The number of carbon atoms of the alkoxy group in the alkoxylated branched alkylene group having 6 to 25 carbon atoms is preferably 1 to 23, and more preferably 4 to 22.

The number of carbon atoms of the alkylcarbonyloxy group in the alkylcarbonyloxylated branched alkylene group having 6 to 25 carbon atoms is preferably 2 to 23, and more preferably 6 to 22.

The chain hydrocarbon group represented by $L^2$ is also preferably an alkylene group having 2 or more carbon atoms substituted with a substituent A from the viewpoint of an improvement in the optical density and rub resistance of the image.

The substituent A is preferably at least one selected from the group consisting of a linear alkyl group having 2 or more carbon atoms, a branched alkyl group having 3 or more carbon atoms, a linear alkoxy group having 2 or more carbon atoms, a branched alkoxy group having 3 or more carbon atoms, a linear alkoxyalkyl group having 2 or more carbon atoms, and a branched alkoxyalkyl group having 3 or more carbon atoms.

The number-average molecular weight (Mn) of the polymer chain represented by $L^2$ is 500 or greater.

The Mn of the polymer chain represented by $L^2$ is preferably 500 to 50,000, more preferably 1,000 to 40,000, even more preferably 1,000 to 30,000, much more preferably 1,000 to 10,000, and further preferably 1,000 to 5,000.

In the present disclosure, the number-average molecular weight (Mn) and the weight-average molecular weight (Mw) mean values calculated in terms of polystyrene by gel permeation chromatography (GPC).

For example, TSKgel (registered trademark) Super HZM-H, TSKgel (registered trademark) Super HZ4000, and TSKgel (registered trademark) Super HZ200 (all manufactured by Tosoh Corporation) are used as columns to be used.

The polymer chain represented by $L^2$ consists of a polyether chain, a polyester chain, a polycaprolactone chain, a polycarbonate chain, a polybutadiene chain, a polyisoprene chain, or a polyolefin chain.

Examples of the polyether chain include a polyethylene glycol chain, a polypropylene glycol chain, and a polybutylene glycol chain.

Examples of the polyester chain include residues obtained by removing hydroxyl groups at both terminals from a compound (2-17) PEs to be described later.

Examples of the polycaprolactone chain include residues obtained by removing hydroxyl groups at both terminals from a compound (2-19) PCL to be described later.

Examples of the polycarbonate chain include residues obtained by removing hydroxyl groups at both terminals from a compound (2-18) PC to be described later.

The polymer chain represented by $L^2$ preferably does not contain a cyclic structure from the viewpoint of an improvement in the optical density and rub resistance of the image.

The polymer chain represented by $L^2$ is preferably a polymer chain having a number-average molecular weight of 500 or greater which consists of a polycarbonate chain from the viewpoint of an improvement in the optical density and rub resistance of the image.

The polycarbonate chain preferably contains an alkylene group having 2 to 12 (preferably 3 to 8, and more preferably 3 to 6) carbon atoms, and more preferably contains an alkylene group having 2 to 12 (preferably 3 to 8, and more preferably 3 to 6) carbon atoms and no cyclic structure. Even more preferably, the polycarbonate chain is a residue obtained by removing hydroxyl groups at both terminals from a compound (2-18) PC to be described later.

From the viewpoint of an improvement in the optical density and rub resistance of the image, $L^2$ is preferably a chain hydrocarbon group having 4 to 25 carbon atoms and a branched structure which may contain an oxygen atom, a nitrogen atom, or a sulfur atom, or a polymer chain having a number-average molecular weight of 500 or greater which consists of a polycarbonate chain.

In such an aspect,

The chain hydrocarbon group having 4 to 25 carbon atoms and a branched structure which may contain an oxygen atom, a nitrogen atom, or a sulfur atom is an unsubstituted branched alkylene group having 6 to 25 carbon atoms, an alkoxylated branched alkylene group having 6 to 25 carbon atoms, or an alkylcarbonyloxylated branched alkylene group having 6 to 25 carbon atoms.

More preferably, the polycarbonate chain contains an alkylene group having 2 to 12 carbon atoms and no cyclic structure.

In Formula (2), $Y^1$ and $Y^2$ each independently represent —O—, —S—, or —NRz-, and Rz represents a hydrogen atom or a hydrocarbon group having 1 to 20 carbon atoms.

Rz is preferably a hydrogen atom or an alkyl group having 1 to 10 carbon atoms, more preferably a hydrogen atom or an alkyl group having 1 to 6 carbon atoms, even more preferably a hydrogen atom, a methyl group, or an ethyl group, and much more preferably a hydrogen atom.

Each of $Y^1$ and $Y^2$ is preferably —O— or —S—, and more preferably —O—.

A compound for forming the unit (2) (hereinafter, also referred to as "compound for forming a unit (2)") is
- preferably a compound having a structure in which "*2-$Y^1$-" and "—$Y^2$-*2" in the unit (2) are respectively replaced with a hydroxyl group, a thiol group, or an amino group (for example, a diol compound, a dithiol compound, a diamine compound, and the like), and
- more preferably a diol compound having a structure in which "*2-$Y^1$-" and "—$Y^2$-*2" in the unit (2) are respectively replaced with a hydroxyl group.

The compound for forming a unit (2) which is a diol compound, provided to form a unit (2) in which $L^2$ is a polymer chain, is a polymer diol.

More specific examples of the polymer diol include a polyether diol, a polyester diol, a polycaprolactone diol, a polycarbonate diol, a polybutadiene diol, a polyisoprene diol, and a polyolefin diol.

Specific examples of the compound for forming a unit (2) will be shown below.

The compound for forming a unit (2) is not limited to the following specific examples.

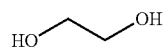
(2-1)

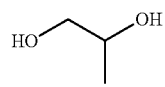
(2-2)

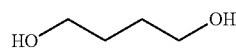
(2-3)

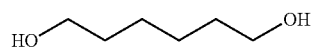
(2-4)

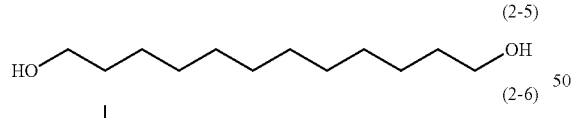
(2-5)

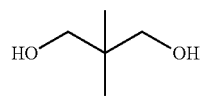
(2-6)

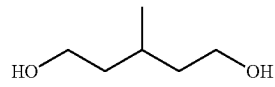
(2-7)

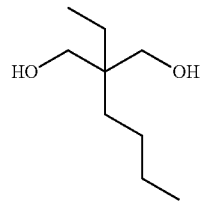
(2-8)

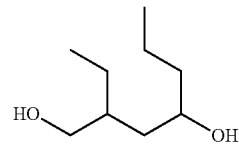
(2-9)

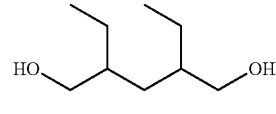
(2-10)

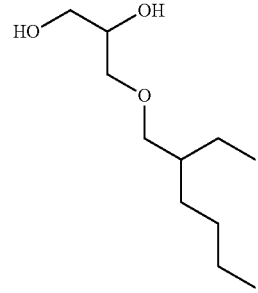
(2-11)

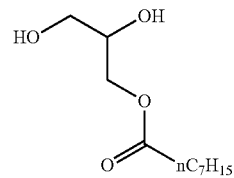
(2-12)

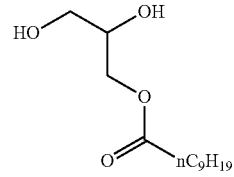
(2-13)

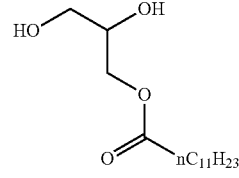
(2-14)

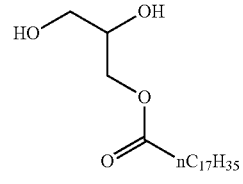
(2-15)

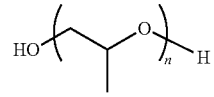
(2-16)

PPG

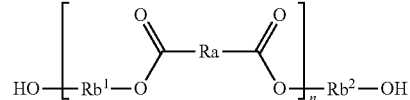
(2-17)

PEs (2-18)

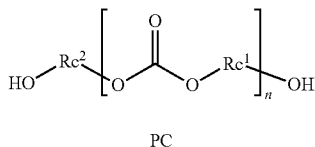

PC (2-19)

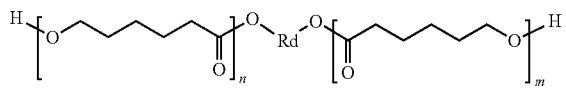

PCL (2-20)

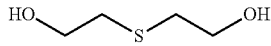

(2-21)

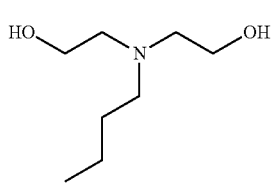

(2-22)

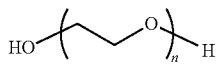

PEG

Among the compounds (2-12) to (2-15), $nC_7H_{15}$, $nC_9H_{19}$, $nC_{11}H_{23}$, and $nC_{17}H_{35}$ represent a normal heptyl group, a normal nonyl group, a normal undecyl group, and a normal heptadecyl group, respectively.

The compound (2-16) PPG is a polypropylene glycol, which is an example of the polyether diol, and n is the number of repetitions.

The compound (2-17) PEs is a polyester diol, n is the number of repetitions, and Ra, $Rb^1$, and $Rb^2$ each independently represent a divalent hydrocarbon group having 2 to 25 carbon atoms. The n Ra's in the compound (2-17) PEs may be the same or different. The n $Rb^1$'s in the compound (2-17) PEs may be the same or different.

The compound (2-18) PC is a polycarbonate diol, n is the number of repetitions, and $Rc^1$ and $Rc^2$ each independently represent an alkylene group having 2 to 12 (preferably 3 to 8, and more preferably 3 to 6) carbon atoms. The n $Rc^1$'s in the compound (2-18) PC may be the same or different.

The compound (2-19) PCL is a polycaprolactone diol, each of n and m is the number of repetitions, and Rd is an alkylene group having 2 to 25 carbon atoms.

Examples of the compound for forming a unit (2) include, in addition to the above-described compounds, a polybutadiene diol (hereinafter, also referred to as "PBD"), a polyisoprene diol (hereinafter, also referred to as "PIP"), and a polyolefin diol.

As the polymer diol as the compound for forming a unit (2), a commercially available product may be used.

Regarding commercially available polymer diols, examples to be described later can be referred to.

Regarding commercially available polymer diols, paragraph 0111 of WO2016/152254A may also be referred to.

From the viewpoint of an improvement of the optical density and rub resistance of the image, the total content of the units (1) and (2) in the polymer P is preferably 50 mass % or greater, more preferably 60 mass % or greater, and even more preferably 80 mass % or greater with respect to the total amount of the polymer P.

In the polymer P, the molar ratio of the unit (2) to the unit (1) (hereinafter, also referred to as "molar ratio [unit (2)/unit (1)]") is preferably 0.20 or greater and less than 1.00, more preferably 0.30 or greater and 0.90 or less, and even more preferably 0.50 or greater and 0.90 or less.

—Hydrophilic Group—

The polymer P contains at least one type of hydrophilic group.

As described above, the hydrophilic group of the polymer P contributes to the dispersion stability of the colored resin particles in the colored resin particle dispersion.

As the hydrophilic group, an anionic group or a nonionic group is preferable, and an anionic group is preferable from the viewpoint of an excellent dispersion stability improvement effect.

For example, in a case where an anionic group and a nonionic group having the same molecular weight are compared each other, the anionic group has a more excellent dispersion stability improvement effect. That is, an anionic group (particularly preferably at least one selected from the group consisting of a carboxyl group and a salt of the carboxyl group) can sufficiently exhibit the dispersion stability improvement effect even in a case where the anionic group has a low molecular weight.

Examples of the nonionic group include a group having a polyether structure, and a monovalent group containing a polyalkyleneoxy group is preferable.

The anionic group may or may not be neutralized.

Examples of the unneutralized anionic group include a carboxyl group, a sulfo group, a sulfate group, a phosphonate group, and a phosphate group.

Examples of the neutralized anionic group include a salt of the carboxyl group, a salt of the sulfo group, a salt of the sulfate group, a salt of the phosphonate group, and a salt of the phosphate group.

In the present disclosure, the neutralized anionic group means an anionic group in the form of "salt" (for example, a salt of a carboxyl group (such as —COONa)).

Neutralization can be performed using, for example, an alkali metal hydroxide (for example, sodium hydroxide, potassium hydroxide, and the like) and an organic amine (for example, triethylamine, and the like).

From the viewpoint of dispersion stability, the hydrophilic group in the polymer P is preferably an anionic group, more preferably at least one selected from the group consisting of a carboxyl group, a salt of the carboxyl group, a sulfo group, a salt of the sulfo group, a sulfate group, a salt of the sulfate group, a phosphonate group, a salt of the phosphonate group, a phosphate group, and a salt of the phosphate group, and even more preferably at least one selected from the group consisting of a carboxyl group and a salt of the carboxyl group.

As the "salt" in the salt of the carboxyl group, the salt of the sulfo group, the salt of the sulfate group, the salt of the phosphonate group, and the salt of the phosphate group, an alkali metal salt or an organic amine salt is preferable, and an alkali metal salt is more preferable.

The alkali metal in the alkali metal salt is preferably K or Na.

In a case where the polymer P contains an anionic group (for example, at least one selected from the group consisting of a carboxyl group and a salt of the carboxyl group) as a hydrophilic group and the total number of millimoles of the anionic group (for example, a carboxyl group and a salt of the carboxyl group) contained in 1 g of the polymer P is defined as an acid value of the polymer P, the acid value of the polymer P is preferably 0.10 mmol/g to 2.00 mmol/g, and more preferably 0.30 mmol/g to 1.50 mmol/g from the viewpoint of dispersion stability.

In a case where the polymer P has an anionic group as a hydrophilic group, the degree of neutralization of the anionic group of the polymer P is preferably 50% to 100%, and more preferably 70% to 90%.

Here, the degree of neutralization refers to a ratio of "the number of neutralized anionic groups" to "the sum of the number of unneutralized anionic groups (for example, carboxyl group) and the number of neutralized anionic groups (for example, salt of carboxyl group) in the polymer P (that is, a ratio [number of neutralized anionic groups/(number of unneutralized anionic groups+number of neutralized anionic groups)]).

The degree of neutralization (%) of the polymer P can be measured by neutralization titration.

—Structural Unit Having Hydrophilic Group—

The polymer P preferably contains at least one type of structural unit having a hydrophilic group.

The structural unit having a hydrophilic group is preferably formed using a compound for introducing a hydrophilic group to be described later as a raw material.

The structural unit having a hydrophilic group is particularly preferably a structural unit represented by Formula (3) (hereinafter, also referred to as "unit (3)"), which is a structural unit having an anionic group.

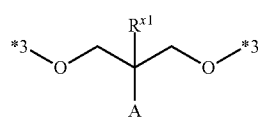

(3)

In Formula (3), $R^{X1}$ represents a hydrogen atom or an alkyl group having 1 to 10 carbon atoms, A represents an anionic group, and two *3's each represent a bonding position.

The unit (3) is preferably bonded to at least the unit (1).

Examples of the anionic group represented by A are the same as those exemplified for the anionic group described above.

The anionic group represented by A is preferably a carboxyl group or a salt of the carboxyl group.

The polymer P may contain a unit (3) in which A is a carboxyl group and a unit (3) in which A is a salt of the carboxyl group.

The content of the structural unit (for example, unit (3)) having a hydrophilic group with respect to the total amount of the polymer P is preferably 3 mass % to 30 mass %, and more preferably 5 mass % to 20 mass %.

The content of the structural unit having an anionic group with respect to the total amount of the polymer P may be adjusted in consideration of the acid value (mmol/g) of the polymer P.

—Compound for Introducing Hydrophilic Group—

A hydrophilic group can be introduced into the polymer P using a compound for introducing a hydrophilic group.

Examples of the compound for introducing an anionic group among compounds for introducing a hydrophilic group include:

compounds in which a hydrogen atom is bonded to each of two *3's in the unit (3); and amino acids such as α-amino acids (specifically, lycine, alanine, arginine, asparagine, aspartic acid, cysteine, glutamine, glutamic acid, glycine, histidine, isoleucine, leucine, methionine, phenylalanine, proline, serine, threonine, tryptophan, tyrosine, and valine).

Examples of the compounds in which a hydrogen atom is bonded to each of two *3's in the unit (3) include 2,2-dimethylolpropionic acid (DMPA) and 2,2-dimethylolbutanoic acid (DMBA).

As the compound for introducing an anionic group, an inorganic base such as sodium hydroxide or potassium hydroxide; an organic base such as triethylamine; or the like may be used to neutralize at least a part of the anionic group.

The anionic group may be neutralized in the course of forming the polymer P (for example, in the course of forming the colored resin particles) (see examples to be described later).

Among compounds for introducing a hydrophilic group, a compound having a polyether structure is preferable, and a compound having a polyoxyalkylene group is more preferable as a compound for introducing a nonionic group.

The polymer P may contain a structural unit other than the above-described structural units.

In a case where the polymer P contains a structural unit having a hydrophilic group, the total content of the unit (1), the unit (2), and the hydrophilic group is preferably 80 mass % or greater with respect to the total amount of the polymer P from the viewpoint of the optical density and the rub resistance of the image and the dispersion stability of the colored resin particles.

—Glass Transition Temperature (Tg)—

The glass transition temperature (Tg) of the polymer P is preferably 60° C. or lower, more preferably 50° C. or lower, even more preferably 45° C. or lower, and much more preferably 40° C. or lower from the viewpoint of an improvement in the optical density and rub resistance of the image.

The lower limit of Tg of the polymer P is not particularly limited, and examples of the lower limit of Tg include −50° C. and −40° C.

In the present disclosure, the glass transition temperature (Tg) of the polymer P means a value measured using differential scanning calorimetry (DSC).

Specifically, the glass transition temperature is measured according to the method described in JIS K 7121 (1987) or JIS K 6240 (2011).

In the present disclosure, the glass transition temperature is an extrapolated glass transition starting temperature (hereinafter, may be referred to as Tig).

The method of measuring the glass transition temperature will be described in detail.

In the measurement of the glass transition temperature, after holding until the stabilization of the device at a temperature about 50° C. lower than a predicted glass transition temperature, the device is heated at a heating rate of 20° C./min to a temperature about 30° C. higher than a temperature at which the glass transition is completed, and a differential thermal analysis (DTA) or DSC curve is created.

The extrapolated glass transition starting temperature (Tig), that is, the glass transition temperature in the present disclosure is measured as a temperature at the intersection of a straight line formed by extending the base line on the low temperature side of the DTA or DSC curve toward the high temperature side and a tangent line drawn at the point where the gradient of the curve of a part where the glass transition is changed in a stepwise manner is maximized.

—Weight-Average Molecular Weight (Mw)—

The weight-average molecular weight (Mw) of the polymer P is preferably 5,000 to 50,000, more preferably 6,000 to 40,000, even more preferably 8,000 to 30,000, and much more preferably 10,000 to 30,000 from the viewpoint of an improvement in the dispersion stability of the colored resin particles.

—Preferable Aspect of Polymer P—

The polymer P preferably contains a structure of a reaction product of
- a compound for forming a unit (1) (preferably, a diisocyanate compound having a structure in which each of two "—NH(C=O)-*1" sites in the unit (1) is replaced with an isocyanate group (—NCO group)),
- a compound for forming a unit (2) (preferably, a compound having a structure in which "*2-$Y^1$-" and "—$Y^2$-*2" in the unit (2) are respectively replaced with a hydroxyl group, a thiol group, or an amino group), and
- a compound for introducing a hydrophilic group (preferably a compound in which a hydrogen atom is bonded to each of two *3's in the unit (3)).

The polymer P preferably contains a urethane bond.

Examples of the urethane bond include a urethane bond formed by bonding the unit (1) and the unit (2) in which each of $Y^1$ and $Y^2$ is —O—, and a urethane bond formed by bonding the unit (1) and the unit (3).

The structure of the terminal of the main chain of the polymer P is not particularly limited, and the terminal group of the main chain of the polymer P is preferably an alkyl group having 1 to 20 carbon atoms (more preferably 1 to 10, and even more preferably 1 to 6).

The alkyl group having 1 to 20 carbon atoms (more preferably 1 to 10, and even more preferably 1 to 6) which is a terminal group can be formed using, as a terminal sealing agent, an alcohol having 1 to 20 carbon atoms (more preferably 1 to 10, and even more preferably 1 to 6), a thioalcohol having 1 to 20 carbon atoms (more preferably 1 to 10, and even more preferably 1 to 6), a monoalkylamine having 1 to 20 carbon atoms (more preferably 1 to 10, and even more preferably 1 to 6), or the like.

The polymer P is preferably a chain polymer, and more preferably a chain polymer containing no cyclic structure from the viewpoint of an improvement in the optical density and rub resistance of the image.

Here, the chain polymer means a polymer containing no crosslinking structure.

The content of the polymer P in the colored resin particles is preferably 10 mass % or greater, more preferably 20 mass % or greater, and even more preferably 30 mass % or greater with respect to the solid content of the colored resin particles from the viewpoint of an improvement in the optical density and rub resistance of the image.

The content of the polymer P in the colored resin particles is preferably 90 mass % or less, more preferably 80 mass % or less, even more preferably 70 mass % or less, and much more preferably 60 mass % or less with respect to the solid content of the colored resin particles from the viewpoint of an improvement in the optical density of the image.

In the present disclosure, in a case where the colored resin particles contain a solvent (for example, an oily organic solvent to be described later, and the same hereinafter), the solid content of the colored resin particles means a total amount excluding the amount of the solvent, and in a case where the colored resin particles contain no solvent, the solid content means a total amount of the colored resin particles.

In the present disclosure, in a case where the colored resin particles contain a solvent, the solids of the colored resin particles mean all the components excluding the solvent, and in a case where the colored resin particles contain no solvent, the solids mean all the components of the colored resin particles.

A preferable aspect of the synthesis method of the polymer P includes reacting the compound for forming a unit (1), the compound for forming a unit (2), and a compound for introducing a hydrophilic group in the presence of an oily organic solvent to be described later.

In addition, by the synthesis method of this aspect, a polymer in which an anionic group as a hydrophilic group is not neutralized may be synthesized, a colored resin particle dispersion may be prepared using the polymer as one of raw materials, and the anionic group of the polymer may be neutralized in the preparation step to faun the polymer P.

(Oil-Soluble Dye)

The colored resin particles contain at least one type of oil-soluble dye.

The term "oil-soluble" in the oil-soluble dye means a property in which the aqueous solubility at 20° C. is 1 mass % or less.

As the oil-soluble dye, dyes in which the word "Solvent" is used in the color index (C.I.) number can be used.

Specific examples of the oil-soluble dye include
- C. I. Solvent Yellow 2, 14, 16, 21, 33, 43, 44, 56, 82, 85, 93, 98, 114, 131, 135, 157, 160, 163, 167, 176, 179, 185, and 189;
- C. I. Solvent Red 8, 23, 24, 25, 49, 52, 109, 111, 119, 122, 124, 135, 146, 149, 150, 168, 169, 172, 179, 195, 196, 197, 207, 222, 227, 312, and 313;
- C. I. Solvent Blue 3, 4, 5, 35, 36, 38, 44, 45, 59, 63, 67, 68, 70, 78, 83, 97, 101, 102, 104, 105, 111, and 122;
- C. I. Solvent Orange 3, 14, 54, 60, 62, 63, 67, 86, and 107;
- C. I. Solvent Violet 8, 9, 11, 13, 14, 26, 28, 31, 36, and 59;
- C. I. Solvent Green 3, 5, 7, and 28;
- C. I. Solvent Brown 53; and
- C. I. Solvent Black 3, 5, 7, 27, 28, 29, and 34.

The oil-soluble dye preferably contains at least one selected from the group consisting of a metal complex dye and a disazo dye from the viewpoint of the optical density of the image.

Examples of the metal complex dye include a chromium complex dye, a copper complex dye, a nigrosine iron complex dye, and a cobalt complex dye.

Among these, a chromium complex dye is preferable from the viewpoint of an improvement in the optical density and rub resistance of the image.

The disazo dye means a non-metal complex dye having two azo groups.

The disazo dye is preferably a compound represented by Formula (M-A).

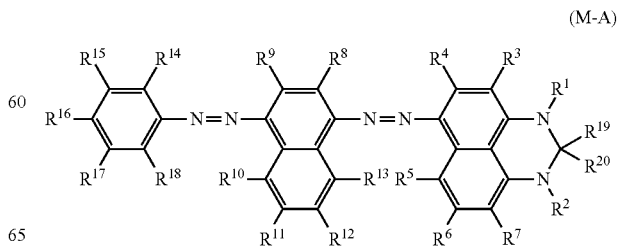

(M-A)

In Formula (M-A), $R^1$ to $R^{20}$ each independently represent a hydrogen atom or a substituent.

Examples of the substituent include substituents (preferably substituents selected from the following substituent group A1) selected from the following substituent group A.

In Formula (M-A), $R^1$ and $R^2$ preferably represent a hydrogen atom.

$R^3$ to $R^{18}$ preferably represent a hydrogen atom.

$R^{19}$ and $R^{20}$ each independently represent preferably an alkyl group, more preferably an alkyl group having 1 to 30 carbon atoms, even more preferably an alkyl group having 1 to 10 carbon atoms, much more preferably an alkyl group having 1 to 6 carbon atoms, and further preferably a methyl group.

The substituent group A refers to the substituent group described in paragraph 0117 of WO2017/131107A.

The substituent group A1 is a group including
  a group A1-2 including a halogen atom, an alkyl group (preferably having 1 to 30 carbon atoms), a cycloalkyl group (preferably having 3 to 30 carbon atoms), an aryl group (preferably having 6 to 30 carbon atoms), a heterocyclic group (preferably having 3 to 30 carbon atoms), an acyl group (preferably having 2 to 30 carbon atoms), a hydroxyl group, a carboxyl group, a sulfo group, a cyano group, a nitro group, an alkoxy group (preferably having 1 to 30 carbon atoms), an aryloxy group (preferably having 6 to 30 carbon atoms), an acyloxy group (preferably having 2 to 30 carbon atoms), an alkoxycarbonyl group (preferably having 2 to 30 carbon atoms), an aryloxycarbonyl group (preferably having 7 to 30 carbon atoms), a carbamoyl group, a sulfamoyl group, an alkylsulfonyl group (preferably having 1 to 30 carbon atoms), an arylsulfonyl group (preferably having 6 to 30 carbon atoms), an amino group, an acylamino group (preferably having 1 to 30 carbon atoms), an alkylsulfonylamino group (preferably having 1 to 30 carbon atoms), and an arylsulfonylamino group (preferably having 6 to 30 carbon atoms), and
  groups obtained by combining two or more in the group A1-2.

A preferable aspect of the compound represented by Formula (M-A) is a compound represented by Formula (M-A-1).

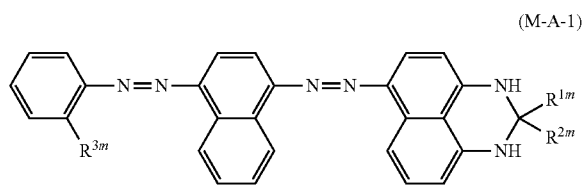

(M-A-1)

In Formula (M-A-1), $R^{1m}$ and $R^{2m}$ each independently represent an alkyl group optionally having 1 to 12 carbon atoms which may have a substituent, and $R^{3m}$ represents a halogen atom, a nitro group, a cyano group, an alkoxycarbonyl group having 2 to 12 carbon atoms, or an acyl group having 2 to 12 carbon atoms. $R^{1m}$ and $R^{2m}$ may be bonded to each other to form a ring.

In Formula (M-A-1), $R^{1m}$ and $R^{2m}$ each independently represent an alkyl group having 1 to 12 carbon atoms which may have a substituent.

The alkyl group represented by $R^{1m}$ and $R^{2m}$ may be linear or branched.

The number of carbon atoms of the alkyl group represented by $R^{1m}$ and $R^{2m}$ is 1 to 12, preferably 1 to 8, and more preferably 1 to 5.

The alkyl group represented by $R^{1m}$ and $R^{2m}$ may have a substituent. The substituent is not particularly limited, and examples thereof include a hydroxyl group, an alkylcarbonyloxy group (preferably an alkylcarbonyloxy group having 2 to 8 carbon atoms), an alkylaminocarbonyloxy group (preferably an alkylaminocarbonyloxy group having 2 to 8 carbon atoms), a cyano group, a carbamoyl group, an alkylcarbamoyl group (preferably an alkylcarbamoyl group having 2 to 8 carbon atoms), an arylcarbamoyl group (preferably an arylcarbamoyl group having 7 to 11 carbon atoms, and more preferably a phenylcarbamoyl group), and an aryl group (preferably an aryl group having 6 to 10 carbon atoms, and more preferably a phenyl group).

The alkyl group represented by $R^{1m}$ and $R^{2m}$ preferably has no substituent (that is, an unsubstituted alkyl group).

$R^{1m}$ and $R^{2m}$ may be bonded to each other to form a ring.

In a case where $R^{1m}$ and $R^{2m}$ are bonded to each other to form a ring, $R^{1m}$ and $R^{2m}$ form an alkylene group. The number of carbon atoms of the alkylene group is preferably 2 to 12, and more preferably 2 to 8. The alkylene group may have a substituent. The substituent is not particularly limited, and examples thereof include those described above as the optional substituent of the alkyl group.

$R^{1m}$ and $R^{2m}$ preferably represent an unsubstituted alkyl group having 1 to 12 carbon atoms, or an alkyl group having a hydroxyl group, an alkylcarbonyloxy group, or an alkylaminocarbonyloxy group as a substituent and having 1 to 12 carbon atoms from the viewpoint of stability to heat, and more preferably represent an unsubstituted alkyl group having 1 to 12 carbon atoms, even more preferably represent an unsubstituted alkyl group having 1 to 8 carbon atoms, and particularly preferably represent an unsubstituted alkyl group having 1 to 5 carbon atoms from the viewpoint of solubility and manufacturing cost.

From the viewpoint of solubility, it is particularly preferable that $R^{1m}$ and $R^{2m}$ are different.

$R^{3m}$ in Formula (M-A-1) represents a halogen atom, a nitro group, a cyano group, an alkoxycarbonyl group having 2 to 12 carbon atoms, or an acyl group having 2 to 12 carbon atoms.

In a case where $R^{3m}$ represents a halogen atom, examples thereof include a fluorine atom, a chlorine atom, a bromine atom, and an iodine atom. A fluorine atom or a chlorine atom is preferable, and a chlorine atom is more preferable.

In a case where $R^{3m}$ represents an alkoxycarbonyl group having 2 to 12 carbon atoms, an alkoxycarbonyl group having 2 to 8 carbon atoms is preferable, and an alkoxycarbonyl group having 2 to 5 carbon atoms is more preferable.

In a case where $R^{3m}$ represents an acyl group having 2 to 12 carbon atoms, an acyl group having 2 to 8 carbon atoms is preferable, and an acyl group having 2 to 5 carbon atoms is more preferable. Examples of the acyl group having 2 to 12 carbon atoms include an alkylcarbonyl group having 2 to 12 carbon atoms and an arylcarbonyl group having 6 to 12 carbon atoms (for example, benzoyl group), and an alkylcarbonyl group having 2 to 12 carbon atoms is preferable.

From the viewpoint of heat resistance, $R^{3m}$ is preferably a fluorine atom, a chlorine atom, a nitro group, a cyano group, an alkoxycarbonyl group having 2 to 12 carbon atoms, or an acyl group having 2 to 12 carbon atoms, more preferably a fluorine atom, a chlorine atom, a nitro group, a cyano group, or an alkylcarbonyl group having 2 to 12 carbon atoms, even more preferably a chlorine atom, a cyano group, a nitro group, or an alkylcarbonyl group having 2 to 5 carbon atoms, and most preferably a chlorine atom, a nitro group, a cyano group, or an acetyl group.

Specific examples [compounds (MA-1) to (MA-64)] of the compound represented by Formula (M-A-1) will be shown below. The compound represented by Formula (M-A-1) is not limited to the specific examples.

In the following, each specific example is represented in a form that $R^{1m}$, $R^{2m}$, and $R^{3m}$ in Formula (M-A-1) are combined.

In the specific examples, the compounds (MA-25) to (MA-30) and (MA-52) are compounds in which $R^{1m}$ and $R^{2m}$ in Formula (M-A-1) are bonded to each other to form a ring. In the specific examples, Ph represents a phenyl group.

| Compound | $R^{1m}$ | $R^{2m}$ | $R^{3m}$ |
| --- | --- | --- | --- |
| (MA-1) | —CH$_3$ | —CH$_3$ | —Cl |
| (MA-2) | —C$_2$H$_5$ | —CH$_3$ | —Cl |
| (MA-3) | —(CH$_2$)$_2$CH$_3$ | —CH$_3$ | —Cl |
| (MA-4) | —CH$_2$(CH$_3$)$_2$ | —CH$_3$ | —Cl |
| (MA-5) | —(CH$_2$)$_3$CH$_3$ | —CH$_3$ | —Cl |
| (MA-6) | —CH$_2$CH(CH$_3$)$_2$ | —CH$_3$ | —Cl |
| (MA-7) | —CH(CH$_3$)CH$_2$CH$_3$ | —CH$_3$ | —Cl |
| (MA-8) | —C(CH$_3$)$_3$ | —CH$_3$ | —Cl |
| (MA-9) | —(CH$_2$)$_4$CH$_3$ | —CH$_3$ | —Cl |
| (MA-10) | —(CH$_2$)$_2$CH(CH$_3$)$_2$ | —CH$_3$ | —Cl |
| (MA-11) | —(CH$_2$)$_5$CH$_3$ | —CH$_3$ | —Cl |
| (MA-12) | —(CH$_2$)$_7$CH$_3$ | —CH$_3$ | —Cl |
| (MA-13) | —(CH$_2$)$_9$CH$_3$ | —CH$_3$ | —Cl |
| (MA-14) | —(CH$_2$)$_{11}$CH$_3$ | —CH$_3$ | —Cl |
| (MA-15) | —C$_2$H$_5$ | —C$_2$H$_5$ | —Cl |
| (MA-16) | —CH$_2$CH(CH$_3$)$_2$ | —CH$_2$CH(CH$_3$)$_2$ | —Cl |
| (MA-17) | —CH$_2$OH | —CH$_3$ | —Cl |
| (MA-18) | —CH$_2$OCOCH$_3$ | —CH$_3$ | —Cl |
| (MA-19) | —CH$_2$OCOCH(CH$_3$)$_2$ | —CH$_3$ | —Cl |
| (MA-20) | —CH$_2$OCOCH(C$_2$H$_5$)CH$_2$CH$_2$CH$_2$CH$_3$ | —CH$_3$ | —Cl |
| (MA-21) | —CH$_2$OCONHCH(CH$_3$)$_2$ | —CH$_3$ | —Cl |
| (MA-22) | —CH$_2$OH | —CH$_2$OH | —Cl |
| (MA-23) | —CH$_2$OCOCH$_3$ | —CH$_2$OCOCH$_3$ | —Cl |
| (MA-24) | —CH$_2$OCOCH(CH$_3$)$_2$ | —CH$_2$OCOCH(CH$_3$)$_2$ | —Cl |
| (MA-25) | —(CH$_2$)$_4$— | | —Cl |
| (MA-26) | —(CH$_2$)$_5$— | | —Cl |
| (MA-27) | —CH(CH$_3$)CH$_2$CH$_2$CH$_2$CH$_2$— | | —Cl |
| (MA-28) | —CH$_2$CH(CH$_3$)CH$_2$CH$_2$CH$_2$— | | —Cl |
| (MA-29) | —CH$_2$CH$_2$CH(OH)CH$_2$CH$_2$— | | —Cl |
| (MA-30) | —CH$_2$CH$_2$CH(OCOCH$_3$)CH$_2$CH$_2$— | | —Cl |
| (MA-31) | —CH$_3$ | —CH$_3$ | —F |
| (MA-32) | —C$_2$H$_5$ | —CH$_3$ | —F |
| (MA-33) | —(CH$_2$)$_4$CH$_3$ | —CH$_3$ | —F |
| (MA-34) | —CH$_3$ | —CH$_3$ | —Br |
| (MA-35) | —C$_2$H$_5$ | —CH$_3$ | —Br |
| (MA-36) | —CH$_3$ | —CH$_3$ | —CH$_3$ |
| (MA-37) | —C$_2$H$_5$ | —CH$_3$ | —CH$_3$ |
| (MA-38) | —CH$_3$ | —CH$_3$ | —CN |
| (MA-39) | —C$_2$H$_5$ | —CH$_3$ | —CN |
| (MA-40) | —CH$_3$ | —CH$_3$ | —CO$_2$CH$_3$ |
| (MA-41) | —C$_2$H$_5$ | —CH$_3$ | —CO$_2$CH$_3$ |
| (MA-42) | —(CH$_2$)$_4$CH$_3$ | —CH$_3$ | —CO$_2$CH$_3$ |
| (MA-43) | —CH$_3$ | —CH$_3$ | —CO$_2$C$_2$H$_5$ |
| (MA-44) | —CH$_3$ | —CH$_3$ | —CO$_2$CH(CH$_3$)$_2$ |
| (MA-45) | —CH$_3$ | —CH$_3$ | —CO$_2$(CH$_2$)$_3$CH$_3$ |
| (MA-46) | —CH$_3$ | —CH$_3$ | —CO$_2$(CH$_2$)$_7$CH$_3$ |
| (MA-47) | —CH$_3$ | —CH$_3$ | —CO$_2$(CH$_2$)$_{10}$CH$_3$ |
| (MA-48) | —CH$_3$ | —CH$_3$ | —COCH$_3$ |
| (MA-49) | —C$_2$H$_5$ | —CH$_3$ | —COCH$_3$ |
| (MA-50) | —(CH$_2$)$_4$CH$_3$ | —CH$_3$ | —COCH$_3$ |
| (MA-51) | —CH$_2$CH(CH$_3$)$_2$ | —CH$_2$CH(CH$_3$)$_2$ | —COCH$_3$ |
| (MA-52) | —CH(CH$_3$)CH$_2$CH$_2$CH$_2$CH$_2$— | | —COCH$_3$ |
| (MA-53) | —CH$_2$OH | —CH$_3$ | —COCH$_3$ |
| (MA-54) | —CH$_2$OCOCH(C$_2$H$_5$)CH$_2$CH$_2$CH$_2$CH$_3$ | —CH$_3$ | —COCH$_3$ |
| (MA-55) | —CH$_2$OH | —CH$_2$OH | —COCH$_3$ |
| (MA-56) | —CH$_2$OCOCH(CH$_3$)$_2$ | —CH$_2$OCOCH(CH$_3$)$_2$ | —COCH$_3$ |
| (MA-57) | —CH$_3$ | —CH$_3$ | —COCH(CH$_3$)$_3$ |
| (MA-58) | —CH$_3$ | —CH$_3$ | —CO(CH$_2$)$_{10}$CH$_3$ |
| (MA-59) | —CH$_3$ | —CH$_3$ | —COPh |
| (MA-60) | —CH$_3$ | —CH$_3$ | —COPh |
| (MA-61) | —CH$_2$CN | —CH$_3$ | —Cl |
| (MA-62) | —CH$_2$CONH$_2$ | —CH$_3$ | —Cl |
| (MA-63) | —CH$_2$CONHPh | —CH$_3$ | —Cl |
| (MA-64) | —CH$_2$Ph | —CH$_3$ | —Cl |

The compound represented by Formula (M-A-1) is preferably manufactured using a compound represented by Formula (M-B) as an intermediate.

The manufacturing method of the compound represented by Formula (M-A-1) will be described later.

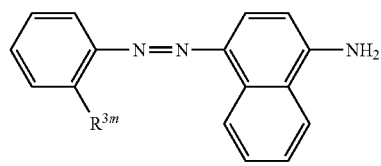
(M-B)

In Formula (M-B), $R^{3m}$ represents a halogen atom, a nitro group, a cyano group, an alkoxycarbonyl group having 2 to 12 carbon atoms, or an acyl group having 2 to 12 carbon atoms.

$R^{3m}$ in Formula (M-B) is synonymous with $R^{3m}$ in Formula (M-A-1), and its specific examples and preferable ranges are also the same as those of the latter.

Specific examples [compounds (MB-1) to (MB-15)] of the compound represented by Formula (M-B) will be shown below. The compound represented by Formula (M-B) is not limited to the following specific examples. In the following, each specific example is represented in a faith showing $R^{3m}$ in Formula (M-B). In the specific examples, Ph represents a phenyl group.

| Compound | $R^{3m}$ |
|---|---|
| (MB-1) | —Cl |
| (MB-2) | —F |
| (MB-3) | —Br |
| (MB-4) | —CH$_3$ |
| (MB-5) | —CN |
| (MB-6) | —CO$_2$CH$_3$ |
| (MB-7) | —CO$_2$C$_2$H$_5$ |
| (MB-8) | —CO$_2$CH(CH$_3$)$_2$ |
| (MB-9) | —CO$_2$(CH$_2$)$_3$CH$_3$ |
| (MB-10) | —CO$_2$(CH$_2$)$_7$CH$_3$ |
| (MB-11) | —CO$_2$(CH$_2$)$_{10}$CH$_3$ |
| (MB-12) | —COCH$_3$ |
| (MB-13) | —COCH(CH$_3$)$_3$ |
| (MB-14) | —CO(CH$_2$)$_{10}$CH$_3$ |
| (MB-15) | —COPh |

The manufacturing method of the compound represented by Formula (MB) is not particularly limited, and a preferable manufacturing method will be described in the preferable manufacturing method of the compound represented by Formula (M-A-1) to be described below.

The manufacturing method of the compound represented by Formula (M-A-1) is not particularly limited, and the compound is preferably manufactured by a method including a step of synthesizing an intermediate (CP) by condensing a ketone compound (X) with 1,8-diaminonaphthalene (first step), a step of forming a diazonium salt of o-substituted aniline (Y) using a diazotizing agent and then coupling the salt with 1-naphthylamine to synthesize a compound represented by Formula (M-B) (second step), and a step of forming a diazonium salt of the compound represented by Formula (M-B) using a diazotizing agent and then coupling the salt with an intermediate (CP) to synthesize a compound (disazo compound) represented by Formula (M-A-1) (third step).

The specific scheme is shown below.

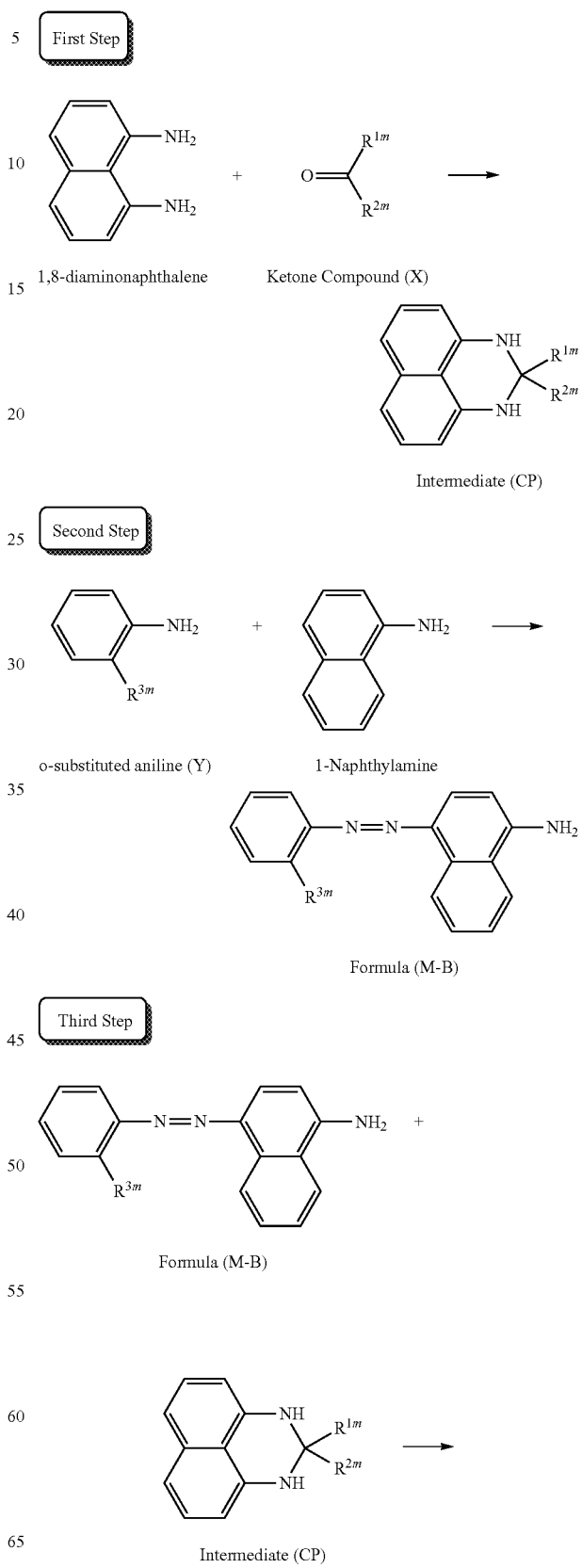

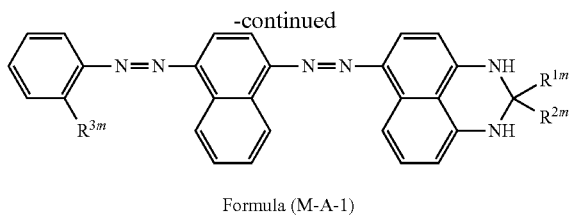

Formula (M-A-1)

All the raw materials required for synthesis are available as reagents. For example, a reagent (catalog No. 043-00795) manufactured by FUJIFILM Wako Pure Chemical Corporation, a reagent (catalog No. N0052) manufactured by Tokyo Chemical Industry Co., Ltd., a reagent (catalog Nos. 037-02316, 066-02122, 143-01505, A10895, and the like) manufactured by FUJIFILM Wako Pure Chemical Corporation, and a reagent (catalog Nos. 037-02316, 060-02125, 025-02492, and the like) manufactured by FUJIFILM Wako Pure Chemical Corporation are available for 1,8-diaminonaphthalene, 1-naphthylamine, a ketone compound (X), and o-substituted aniline (Y), respectively.

A solvent may be used in the first step, or the reaction may be performed without a solvent. In a case where a solvent is used, water, methanol, or ethanol can be preferably used as the solvent.

A catalyst may be used in the first step, and a concentrated sulfuric acid can be preferably used as the catalyst.

Examples of the diazotizing agent which can be used in the second step include sodium nitrite, a nitrosyl sulfuric acid, and nitrite esters (for example, isoamyl nitrite). Sodium nitrite is preferable since it is inexpensively available.

Examples of the solvent which can be used in the diazotization in the second step include water, an acetic acid, a propionic acid, a hydrochloric acid, and a sulfuric acid, and water is preferable in view of inexpensive manufacturing cost.

In addition, a strong acid is usually used in the diazotization in the second step. Examples of the strong acid include a hydrochloric acid, a sulfuric acid, a phosphoric acid, and a methanesulfonic acid, and hydrochloric acid or a sulfuric acid can be preferably used. The amount of the strong acid used is usually 2.1 to 10 molar equivalents, and preferably 2.1 to 4 molar equivalents with respect to the number of moles of o-substituted aniline.

In the diazotization in the second step, an amidosulfuric acid or urea may be used to deactivate the unreacted diazotizing agent.

Examples of the solvent used in the coupling reaction in the second step include water, methanol, acetone, tetrahydrofuran, acetonitrile, an acetic acid, a propionic acid, and mixtures thereof. Although the solvent depends on the reactive substrate, acetone, methanol, and the like can be preferably used.

In the coupling reaction in the second step, a base may be used in combination in order to adjust the pH. As the base, sodium hydroxide or sodium acetate can be used. However, the reaction usually proceeds sufficiently without using a base in combination.

As a diazotizing agent, a diazotizing solvent, a strong acid required for diazotization, a deactivating agent for an unreacted diazotizing agent, and a coupling solvent which can be used in the third step, those exemplified in the second step can be used, respectively.

The oil-soluble dye preferably contains at least one selected from the group consisting of a chromium complex dye and a disazo dye from the viewpoint of the optical density of the image.

The oil-soluble dye preferably contains a chromium complex dye from the viewpoint of the optical density and rub resistance of the image.

The content of the oil-soluble dye in the colored resin particles is preferably 10 mass % or greater, more preferably 20 mass % or greater, even more preferably 30 mass % or greater, and much more preferably 40 mass % or greater with respect to the solid content of the colored resin particles from the viewpoint of an improvement in the optical density of the image.

The content of the oil-soluble dye in the colored resin particles is preferably 90 mass % or less, more preferably 80 mass % or less, and even more preferably 70 mass % or less with respect to the solid content of the colored resin particles from the viewpoint of an improvement in the optical density and rub resistance of the image.

The mass ratio of the content of the polymer P to the content of the oil-soluble dye (hereinafter, also referred to as "mass ratio [P/dye]") is preferably 0.10 to 4.00, more preferably 0.10 to 2.50, even more preferably 0.20 to 2.50, much more preferably 0.20 to 1.50, and further preferably 0.25 to 1.00 from the viewpoint of an improvement in the optical density of the image.

(Other Components)

Optionally, the colored resin particles may or may not contain a component other than the polymer P and the oil-soluble dye.

The total content of the polymer P and the oil-soluble dye in the colored resin particles is preferably 80 mass % or greater with respect to the solid content of the colored resin particles from the viewpoint of an improvement in the optical density and rub resistance of the image.

The solid content of the colored resin particles is preferably 80 mass % or greater with respect to the total amount of the colored resin particles from the viewpoint of an improvement in the optical density and rub resistance of the image.

Examples of other components which can be contained in the colored resin particles include oily organic solvents.

In a case where the colored resin particles contain an oily organic solvent, only one type or two or more types of oily organic solvents may be contained.

The oily organic solvent refers to an organic solvent whose aqueous solubility at 20° C. is 10 mass % or less.

The aqueous solubility of the oily organic solvent at 20° C. is preferably 5 mass % or less, and more preferably 1 mass % or less. In a case where the aqueous solubility of the oily organic solvent at 20° C. is 5 mass % or less, the oil (organic component) and the water are less likely to be mixed during emulsification, and thus the synthesis suitability and the stability of the colored resin particles are improved.

As the oily organic solvent, any of a volatile oily organic solvent or a non-volatile oily organic solvent may be contained. Among these, a non-volatile oily organic solvent is more likely to be present in the colored resin particles.

Here, the volatile oily organic solvent means an oily organic solvent having a boiling point of lower than 100° C. Examples of the volatile oily organic solvent include ester-based solvents such as ethyl acetate and ketone-based solvents such as methyl ethyl ketone.

The non-volatile organic solvent means an oily organic solvent having a boiling point of higher than 100° C.

As the non-volatile oily organic solvent, an oily organic solvent having a boiling point of 180° C. or higher is preferable from the viewpoint of exhibiting non-volatility during the reaction and of dispersion stability of the colored resin particle dispersion or the ink during storage.

In the present disclosure, the boiling point is a value of the boiling point under standard conditions (1 atm, 25° C.). 1 atm equals 101.325 kPa.

Specific examples of the non-volatile oily organic solvent include non-halogen phosphate esters (for example, TCP manufactured by DAIHACHI CHEMICAL INDUSTRY CO., LTD.), alkyl group-substituted aromatic compounds (for example, alkene KS-41 manufactured by JXTG Energy Corporation and KMC500 manufactured by Kureha Chemical Industry Co., Ltd.), long-chain alkyl group-substituted ester compounds (for example, methyl laurate KS-33 manufactured by NOF Corporation and tris(2-ethylhexanoic acid) glycerol manufactured by FUJIFILM Wako Pure Chemical Corporation), dibasic acid esters (for example DBE manufactured by INVISTA, and dimethyl succinate, dimethyl glutarate, and diisopropyl succinate manufactured by TOKYO CHEMICAL INDUSTRY), and alkylene glycol derivatives (for example, ethylene glycol monobutyl ether acetate, diethylene glycol monobutyl ether acetate, diethylene glycol dibutyl ether, and diethylene glycol dibenzoate manufactured by TOKYO CHEMICAL INDUSTRY).

From the viewpoint of solubility of the dye represented by Formula (M-A), DBE, dimethyl succinate, dimethyl glutarate, diisopropyl succinate, tris(2-ethylhexanoic acid)glycerol, diethylene glycol monobutyl ether acetate, or diethylene glycol dibutyl ether is particularly preferable.

In a case where the colored resin particles contain an oily organic solvent, the content of the oily organic solvent is preferably 0.1 mass % to 20 mass %, more preferably 1 mass % to 15 mass %, and even more preferably 3 mass % to 10 mass % with respect to the solid content of the colored resin particles.

(Volume Average Particle Diameter)

The volume average particle diameter of the colored resin particles is preferably 200 nm or less, more preferably 20 nm to 200 nm, and even more preferably 40 nm to 150 nm. In a case where the volume average particle diameter of the colored resin particles is 200 nm or less, the jetting property of an inkjet ink prepared is improved.

The volume average particle diameter of the colored resin particles mentioned here means a value measured using a particle size distribution measurement apparatus (for example, NANOTRAC UPA EX150, manufactured by Nikkiso Co., Ltd., trade name).

The colored resin particle dispersion according to the embodiment of the present disclosure contains water and the above-described colored resin particles.

The colored resin particle dispersion according to the embodiment of the present disclosure may or may not contain a component other than the water and the colored resin particles.

The total content of the water and the colored resin particles in the colored resin particle dispersion is preferably 80 mass % or greater with respect to the total amount of the colored resin particle dispersion from the viewpoint of an improvement in the optical density and rub resistance of the image.

<Example of Manufacturing Method of Colored Resin Particle Dispersion>

The manufacturing method of the colored resin particle dispersion according to the embodiment of the present disclosure is not particularly limited.

Hereinafter, an example of the manufacturing method of the colored resin particle dispersion (hereinafter, also referred to as production method A") will be shown.

The production method A includes a step of preparing an oil phase component containing an oily organic solvent (that is, a volatile oily organic solvent and/or a non-volatile oily organic solvent), a polymer P or a polymer P before neutralization of an anionic group as a hydrophilic group, and an oil-soluble dye, a step of preparing a water phase component containing water (and a neutralizing agent as necessary), and an emulsification step of mixing the oil phase component and the water phase component and emulsifying the obtained mixture to obtain an emulsion.

In the production method A, due to the emulsification step, colored resin particles are formed, and the formed colored resin particles are dispersed in the water. Whereby, a colored resin particle dispersion in which the colored resin particles are dispersed in the water is obtained.

In a case where, as the oil phase component, an oil phase component containing the polymer P before neutralization of an anionic group as a hydrophilic group is used, and as the water phase component, a water phase component containing water and a neutralizing agent is used, at least a part of the anionic group in the polymer P before neutralization of the anionic group is neutralized in the emulsification step, and thus colored resin particles containing the polymer P containing the neutralized anionic group (for example, —COONa) are formed.

A basic compound such as sodium hydroxide, potassium hydroxide, or triethylamine can be used as the neutralizing agent.

In the emulsification step, the emulsification method is not particularly limited, and examples thereof include emulsification by an emulsification device (for example, a disperser) such as a homogenizer.

The rotation speed of the disperser in the emulsification is, for example, 5,000 rpm to 20,000 rpm, and preferably 10,000 rpm to 15,000 rpm. Here, rpm is an abbreviation for revolutions per minute.

The rotation time in the emulsification is, for example, 1 minute to 120 minutes, preferably 3 minutes to 60 minutes, more preferably 3 minutes to 30 minutes, and even more preferably 5 minutes to 15 minutes.

The emulsification in the emulsification step may be performed under heating.

By performing the emulsification under heating, the colored resin particles can be more efficiently formed.

In addition, by performing the emulsification under heating, at least a part of the oily organic solvent in the oil phase component is easily removed from the mixture.

In a case where the emulsification is performed under heating, the heating temperature is preferably 35° C. to 70° C., and more preferably 40° C. to 60° C.

The production method A may include a heating step of heating the emulsion or a mixture of the emulsion and water to remove at least a part of the oily organic solvent.

The heating temperature in the heating step is preferably 35° C. to 70° C., and more preferably 40° C. to 60° C.

[Ink]

An ink according to the embodiment of the present disclosure contains the above-described colored resin particle dispersion according to the embodiment of the present disclosure.

In other words, the ink according to the embodiment of the present disclosure contains the respective components (at least the water and the colored resin particles) in the colored resin particle dispersion according to the embodiment of the present disclosure.

In the ink according to the embodiment of the present disclosure, the water content is, for example, 40 mass % or greater, preferably 50 mass % or greater, and more preferably 60 mass % or greater with respect to the total amount of the ink.

The upper limit of the water content depends on the amount of the solids in the ink, and is, for example, 90 mass % with respect to the total amount of the ink.

In the ink according to the embodiment of the present disclosure, the solid content of the colored resin particles is preferably 1 to 20 mass %, more preferably 1 to 15 mass %, and even more preferably 3 to 10 mass % with respect to the total amount of the ink.

<Aqueous Organic Solvent>

The ink according to the embodiment of the present disclosure preferably contains at least one type of aqueous organic solvent.

Accordingly, the ink has excellent stability (that is, precipitation and the like are unlikely to occur), and also has an excellent jetting property in a case where the ink is used as an inkjet ink.

Here, the term "aqueous" in the aqueous organic solvent means that the amount of the solvent dissolved in 100 g of distilled water at 25° C. is greater than 1 g.

The amount of the aqueous organic solvent dissolved is preferably 5 g or greater, more preferably 10 g or greater, and even more preferably 20 g or greater.

Examples of the aqueous organic solvent include alcohol-based solvents, amide-based solvents, nitrile-based solvents, polyalkylene glycol-based solvents, and polyalkylene glycol alkyl ether-based solvents, and alcohol-based solvents or amide-based solvents are preferable.

Examples of the aqueous organic solvent include methanol, ethanol, n-propanol, isopropanol, n-butanol, isobutanol, tert-butanol, trimethylolpropane, ethylene glycol, diethylene glycol, triethylene glycol, tetraethylene glycol, propylene glycol, butylene glycol, 1,2,6-hexanetriol, thioglycol, hexylene glycol, glycerin, diglycerin, 2-pyrrolidone, N-methyl-2-pyrrolidone, 1,5-pentanediol, 1,6-hexanediol, ethylene glycol monoethyl ether, ethylene glycol monobutyl ether, acetonitrile, polyethylene glycol (having a molecular weight of 400 to 800, for example), hydroxyethylpyrrolidone, hydroxypropylpyrrolidone, valerolactam, caprolactam, heptalactam, polyethylene glycol monomethyl ether (having a molecular weight of 400), polyethylene glycol monomethyl ether (having a molecular weight of 550), polyethylene glycol dimethyl ether (having a molecular weight of 500), tripropylene glycol, tetrapropylene glycol, polypropylene glycol (having a molecular weight of 400), polypropylene glycol (having a molecular weight of 600), and polypropylene glycol (having a molecular weight of 700).

The aqueous organic solvent contains
preferably at least one selected from the group consisting of trimethylolpropane, ethylene glycol, diethylene glycol, triethylene glycol, tetraethylene glycol, propylene glycol, glycerin, 2-pyrrolidone, 1,5-pentanediol, 1,6-hexanediol, and ethylene glycol monobutyl ether,
more preferably at least one selected from the group consisting of ethylene glycol, diethylene glycol, triethylene glycol, tetraethylene glycol, propylene glycol, glycerin, 2-pyrrolidone, and ethylene glycol monobutyl ether, and
even more preferably at least one selected from the group consisting of ethylene glycol, glycerin, 2-pyrrolidone, and tetraethylene glycol.

The content of the aqueous organic solvent in the ink is preferably 5 mass % to 50 mass %, more preferably 5 mass % to 40 mass %, and even more preferably 10 mass % to 30 mass % with respect to the total amount of the ink.

In a case where the content of the aqueous organic solvent is within the above range, the ink has excellent stability (that is, precipitation and the like are unlikely to occur), and also has an excellent jetting property in a case where the ink is used as an inkjet ink.

<Crosslinking Agent>

The ink according to the embodiment of the present disclosure may further contain at least one type of crosslinking agent.

The crosslinking agent is preferably a compound having at least two crosslinkable groups.

The crosslinkable group of the crosslinking agent is preferably a carboxyl group, a hydroxyl group, a sulfonate group, an amide group, or the like.

Examples of the crosslinking agent include blocked isocyanate-based compounds, oxazoline-based compounds, and carbodiimide compounds.

Among these,
blocked isocyanate-based compounds in which a trimethylolpropane (TMP) adduct or isocyanurate of a diisocyanate (for example, hexamethylene diisocyanate (HDI), hydrogenated xylylene diisocyanate (H6XDI), isophorone diisocyanate (IPDI), or dicyclohexylmethane diisocyanate (H12MDI)) is blocked with a blocking agent; or carbodiimide compounds are preferable.

The blocking agent used for the blocked isocyanate-based compound is preferably diethyl malonate (DEM), diisopropylamine (DIPA), 1,2,4-triazole (TRIA), 3,5-dimethylpyrazole (DMP), or butanone oxime (MEKO) from the viewpoint of dissociation temperature.

The blocked isocyanate-based compounds can also be used as an oligomer in which a part of the isocyanate group thereof is reacted with a polyol, a polycarbonate, a polyester, a polyether, or the like.

As the carbodiimide compounds, crosslinking agents CARBODILITE E-02, E-03A, and E-05 (all are product names) for an aqueous resin manufactured by Nisshinbo Chemical Inc. are preferable, and E-05 is particularly preferable from the viewpoint of storage stability and reactivity.

The dissociation temperature of the crosslinking agent is preferably as low as possible from the viewpoint of crosslinking efficiency, but is preferably as high as possible from the viewpoint of storage stability.

The dissociation temperature is preferably 90° C. to 180° C., more preferably 90° C. to 120° C., and particularly preferably 110° C. to 120° C. from the viewpoint of balance between the crosslinking efficiency and the storage stability.

The crosslinking agent is preferably blended with the ink as what is water-soluble or self-emulsifiable by giving a hydrophilic group. In this state, the viscosity of the blended ink can be lowered, and excellent redispersibility can be obtained.

The crosslinking agent may be crosslinking agent particles.

The average particle diameter of the crosslinking agent particles is preferably 200 mu or less from the viewpoint of an improvement in the jetting property in an inkjet process.

A value of a volume average particle diameter (MV) measured using a particle size distribution measurement apparatus (NANOTRAC UPA EX150, manufactured by Nikkiso Co., Ltd., trade name) can be used as the average particle diameter mentioned here.

The crosslinking agent particles are not particularly limited, and examples thereof include ELASTRON BN-77 (blocked isocyanate, particle diameter: 19 nm, dissociation temperature: 120° C. or higher, manufactured by DKS Co. Ltd.), ELASTRON BN-27 (blocked isocyanate, particle diameter: 108 nm, dissociation temperature: 180° C. or higher, manufactured by DKS Co. Ltd.), DURANATE WM44-70G (blocked isocyanate, particle diameter: 42 nm, dissociation temperature: about 90° C., manufactured by Asahi Kasei Corporation), and TRIXENE AQUA BI200 (blocked isocyanate, particle diameter: 94 nm, dissociation temperature: 110° C. to 120° C., manufactured by BAXENDEN).

In a case where the ink contains the crosslinking agent, the content of the crosslinking agent in the ink is preferably 0.1 mass % to 10 mass %, more preferably 0.5 mass % to 8 mass %, and even more preferably 1 mass % to 5 mass % with respect to the total amount of the ink.

<Pigment>

The ink according to the embodiment of the present disclosure may further contain at least one type of pigment from the viewpoint of hue adjustment or an enhancement in the color density.

Examples of the pigment include
Carbon Black, Aniline Black;
C. I. Pigment Yellow 3, 12, 53, 55, 74, 81, 83, 93, 94, 95, 97, 98, 100, 101, 104, 108, 109, 110, 117, 120, 128, 138, 153, 155, 180, and 185;
C. I. Pigment Red 112, 114, 122, 123, 146, 149, 166, 168, 170, 172, 177, 178, 179, 185, 190, 193, 202, 206, 209, and 219;
C. I. Pigment Violet 19 and 23;
C. I. Pigment Orange 36, 43, and 64;
C. I. Pigment Blue 15, 15:1, 15:2, 15:3, 15:4, 15:6, 16, 17:1, 56, 60, and 63; and
C. I. Pigment Green 36.

In a case where the ink according to the embodiment of the present invention contains a pigment, the content of the pigment in the ink is preferably 0.5 mass % to 10 mass %, more preferably 0.5 mass % to 8 mass %, and even more preferably 0.5 mass % to 5 mass % with respect to the total amount of the ink.

In the present disclosure, an aqueous dispersion of a pigment (also referred to as "aqueous pigment dispersion") in which a pigment is dispersed in water using a dispersant can also be used in the preparation of the ink. For example, the pigment dispersion described in JP2012-7148A can be used as the aqueous pigment dispersion. In addition, a commercially available product such as Pro-jet Black APD1000 (manufactured by Fujifilm Imaging Colorants) can be used as the aqueous pigment dispersion.

A self-dispersing pigment can also be used as the pigment.

The self-dispersing pigment is a pigment which is dispersible in water without using a dispersant. Examples of the self-dispersing pigment include those in which at least one of hydrophilic groups such as a carbonyl group, a hydroxyl group, a carboxyl group, a sulfo group, and a phosphate group or salts thereof is introduced to the surface of the pigment by a chemical bond, either directly or via another group.

The self-dispersing pigment is preferably self-dispersing carbon black.

Examples of the useable self-dispersing pigment include commercially available products such as self-dispersing carbon black CAB-O-JET 200, 300, and 400 (all manufactured by Cabot Corporation), BONJET CW-1 (500 µmol/g, as a carboxyl group) and CW-2 (470 µmol/g, as a carboxyl group) (all manufactured by Orient Chemical Industries Co., Ltd.), and Aqua-Black 162 (about 800 µmol/g, as a carboxyl group) of Tokai Carbon Co., Ltd.

As the pigment, either an aqueous dispersion of a pigment obtained by dispersing a pigment in water using a dispersant or a self-dispersing pigment can be preferably used.

<Wax>

The ink according to the embodiment of the present disclosure may contain at least one type of wax.

Accordingly, the rub resistance of the image can be improved.

The wax is preferably present in the foam of particles in the ink according to the embodiment of the present disclosure.

The wax having a particle form is referred below to as "wax particles".

A dispersion in which a wax is dispersed in water is preferably used as the wax particles.

As the wax, polyethylene wax, paraffin wax, or carnauba wax is preferable.

The melting point of the wax is preferably in the range of 60° C. to 120° C., and more preferably 60° C. to 100° C. from the viewpoint of an improvement in the stability and frictionality. It is possible to improve the stability of the printing ink by increasing the melting point, and not increasing the melting point higher than necessary is effective in improving the frictionality.

The melting point of the wax can be measured by a general melting point measuring machine.

The volume average particle diameter (Mw) of the wax particles is preferably 0.3 µm or less, more preferably 0.2 µm or less, and particularly preferably 0.1 µm or less from the viewpoint of the jetting property in an inkjet process.

The volume average particle diameter can be measured in the same manner as in the case of the colored resin particles described above.

In a case where the ink according to the embodiment of the present disclosure contains wax, the content of the wax is preferably 0.1 mass % to 10 mass %, more preferably 0.5 mass % to 8 mass %, and even more preferably 1 mass % to 5 mass % with respect to the total amount of the ink.

As the wax particles, a commercially available product may be used.

Examples of the commercially available product include POLYLON L-787 (manufactured by CHUKYO YUSHI CO., LTD., polyethylene, nonion, melting point: 102° C., volume average particle diameter: 0.1 µm), HYDRIN-703 (manufactured by CHUKYO YUSHI CO., LTD., paraffin, anion, melting point: 75° C., volume average particle diameter: 0.1 µm), R108 (manufactured by CHUKYO YUSHI CO., LTD., paraffin, nonion, melting point: 66° C., volume average particle diameter: 0.2 µm), and Cellosol 524 (manufactured by CHUKYO YUSHI CO., LTD., carnauba, nonion, melting point: 83° C., volume average particle diameter: 0.07 µm).

<Surfactant>

The ink according to the embodiment of the present disclosure may contain at least one type of surfactant.

The surfactant is not particularly limited, and known surfactants such as anionic surfactants, cationic surfactants, and nonionic surfactants can be used.

As the surfactant, a nonionic surfactant is preferable from the viewpoint of jetting property for a case where the ink is used as an inkjet ink, and an acetylene-based surfactant is particularly preferable.

Examples of commercially available products of the acetylene-based surfactant include SURFYNOL (registered trademark) series manufactured by Nissin Chemical Industry Co., Ltd. and OLFINE (registered trademark) series manufactured by Nissin Chemical Industry Co., Ltd.

In a case where the ink according to the embodiment of the present disclosure contains a surfactant, the content of the surfactant is preferably 0.1 mass % to 2.0 mass %, and more preferably 0.5 mass % to 2.0 mass % with respect to the total amount of the ink from the viewpoint of jetting property for a case where the ink is used as an inkjet ink.

<Other Components>

The ink according to the embodiment of the present disclosure may contain a component other than the above-described components.

Examples of other components include dyes other than the oil-soluble dye, pigments, crosslinking agents, waxes, pH adjusters, fluorescent brighteners, surface tension adjusters, antifoaming agents, antidrying agents, lubricants, thickeners, ultraviolet absorbers, antifading agents, antistatic agents, matting agents, antioxidants, resistivity modifiers, rust inhibitors, reduction inhibitors, preservatives, fungicides, and chelating agents.

Regarding other components, the description in WO2017/131107A may be referred to.

<Use>

There are no particular restrictions on the use of the ink according to the embodiment of the present disclosure.

The ink according to the embodiment of the present disclosure is used as, for example, an inkjet ink. In a case where the ink according to the embodiment of the present disclosure is used as an inkjet ink, the jetting property from an inkjet head is secured.

Furthermore, as described above, since the ink according to the embodiment of the present disclosure can form an image having excellent optical density and rub resistance on a fabric, the ink according to the embodiment of the present disclosure is suitable as a printing ink, and is particularly suitable as an inkjet printing ink.

In a case where the ink according to the embodiment of the present disclosure is used as an inkjet ink, the surface tension of the ink is preferably 20 mN/m to 70 mN/m, and more preferably 25 mN/m to 60 mN/m.

The surface tension mentioned here means a value measured at 25° C.

The surface tension can be measured by using, for example, an Automatic Surface Tensiometer CBVP-Z (manufactured by Kyowa Interface Science Co., Ltd.).

In a case where the ink according to the embodiment of the present disclosure is used as an inkjet ink, the viscosity of the ink is preferably 40 mPa·s or less, and more preferably 30 mPa·s or less.

The viscosity mentioned here is a value measured at 25° C.

As a viscometer, for example, a viscometer VISCOMETER TV-22 (manufactured by TOKI SANGYO CO., LTD.) can be used.

[Ink Set]

The ink according to the embodiment of the present disclosure may be used alone or in the form of an ink set.

The ink set mentioned here is provided with two or more types of inks, and at least one of the two or more types of inks is an ink set which is the ink according to the embodiment of the present disclosure.

That is, the ink set may consist of two or more types of the inks according to the embodiment of the present disclosure, or may consist of one or more types of the inks according to the embodiment of the present disclosure and one or more types of other inks.

Examples of the ink set include an ink set including a black ink, a yellow ink, a magenta ink, and a cyan ink, in which at least one ink of the ink set is the ink according to the embodiment of the present disclosure.

Among the aspects, an aspect in which the black ink is the ink according to the embodiment of the present disclosure is particularly preferable.

[Inkjet Printing Method]

The ink according to the embodiment of the present disclosure can be used for image formation on any base material, and is particularly suitable for image formation on a fabric.

Examples of the image formation on a fabric include the following inkjet printing method A.

The inkjet printing method A has
a step of forming an image by applying the ink according to the embodiment of the present disclosure to a fabric by an inkjet method (hereinafter, also referred to as "image forming step") and
a step of heat-treating the image (hereinafter, also referred to as "heat treatment step").

According to the inkjet printing method A, an image having excellent optical density and rub resistance can be formed on a fabric.

Specific examples of the fabric will be described later.

The inkjet printing method A does not require a transfer step, a printing paste application step, or the like, which may be provided in a general printing method.

The inkjet printing method A also does not require a steam treatment step (that is, a step of fixing an image by a steam treatment) which may be provided in a general inkjet printing method. In a general inkjet printing method, particularly, the optical density and rub resistance of an image may be secured by the steam treatment step.

In the inkjet printing method A, an image having excellent optical density and rub resistance can be formed on a fabric even in a case where the steam treatment step is omitted.

In the inkjet printing method A, the fabric to be subjected to image formation may be a fabric pretreated with an aqueous pretreatment liquid containing an aggregating agent.

In a case where the fabric to be subjected to image formation is pretreated, an image having a high color density is formed on a surface of the fabric by the action of the aggregating agent in the image forming step. Next, in the heat treatment step, the image permeates into the fabric by the action of the polymer P. Through these processes, an image having more excellent optical density and rub resistance is fixed on the fabric.

The pretreated fabric may be previously prepared prior to the implementation of the inkjet printing method A.

That is, the inkjet printing method A may have a pretreatment step of obtaining a pretreated fabric by applying an aqueous pretreatment liquid containing an aggregating agent to a fabric before the image forming step.

Hereinafter, the respective steps which can be included in the inkjet printing method A will be described.

(Pretreatment Step)

The pretreatment step is a step of obtaining a pretreated fabric by applying an aqueous pretreatment liquid containing an aggregating agent to a fabric.

The method of applying an aqueous pretreatment liquid to the fabric is not particularly limited, and examples thereof include a coating method, a padding method, an inkjet method, a spraying method, and a screen printing method.

The aggregating agent contained in the aqueous pretreatment liquid is not particularly limited as long as it acts to aggregate the colored resin particles. The aggregating agent is preferably at least one selected from an organic acid, a polyvalent metal salt, or a cationic compound, and more preferably at least one selected from a polyvalent metal salt or a cationic compound.

—Polyvalent Metal Salt—

The polyvalent metal salt is a compound composed of a di- or higher-valent metal ion and an anion.

Specific examples thereof include calcium chloride, calcium nitrate, calcium sulfate, calcium acetate, calcium hydroxide, calcium carbonate, magnesium chloride, magnesium acetate, magnesium sulfate, magnesium carbonate, barium sulfate, barium chloride, zinc sulfide, zinc carbonate, and copper nitrate.

—Cationic Compound—

The cationic compound is not particularly limited, and may be a low-molecular-weight compound or a polymer compound.

Examples of the low-molecular-weight cationic compound include (2-hydroxyethyl)trimethylammonium chloride, benzoylcholine chloride, benzyltriethylammonium chloride, trimethylacetohydrazide ammonium chloride, 1-butyl-1-methylpyrrolidinium chloride, 3-hydroxy-4-(trimethylammonio)butyrate hydrochloride, glycidyltrimethylammonium chloride, and L-carnitine hydrochloride.

Examples of the cationic polymer compound include water-soluble cationic polymers which are positively charged in water, such as polyallylamine or derivatives thereof, amine-epihalohydrin copolymers, or other quaternary ammonium salt type cationic polymers. In some cases, a water-dispersible cationic polymer can also be used.

Aggregating agents may be used alone or in combination of two or more types thereof.

The aqueous pretreatment liquid contains, for example, the above-described aggregating agent and water.

The aqueous pretreatment liquid may further contain other components such as an aqueous organic solvent and a surfactant.

As components which can be contained in the aqueous pretreatment liquid, the components which can be contained in the ink can be appropriately referred to.

(Image Forming Step)

The image forming step is a step of forming an image by applying the ink according to the embodiment of the present disclosure to a fabric by an inkjet method.

In the present disclosure, the fabric having an image formed thereon by the image forming step may be referred to as a colored fabric.

The application of the ink by the inkjet method in the image forming step can be performed using a known inkjet recording device.

The inkjet recording device is not particularly limited, and a known inkjet recording device capable of achieving a desired resolution can be optionally selected and used.

Examples of the inkjet recording device include a device including an ink supply system, a temperature sensor, and a heating unit.

The ink supply system includes, for example, a source tank containing the ink according to the embodiment of the present disclosure, a supply pipe, an ink supply tank immediately before the inkjet head, a filter, and a piezo inkjet head. The piezo inkjet head can be driven so as to eject multi-size dots of preferably 1 pL (picoliter) to 100 pL, and more preferably 8 pL to 30 pL with a resolution of preferably 320 dpi×320 dpi to 4,000 dpi×4,000 dpi, more preferably 400 dpi×400 dpi to 1,600 dpi×1,600 dpi, and even more preferably 720 dpi×720 dpi. The dpi (dot per inch) indicates the number of dots per 2.54 cm (1 inch).

<Heat Treatment Step>

The heat treatment step is a step of heat-treating the image obtained in the image forming step.

In this step, due to the heat treatment, the image peinieates into the fabric by the action of the polymer P in the colored resin particles, whereby an image having excellent optical density and rub resistance can be obtained.

The heat treatment temperature (temperature of the image) in the heat treatment step is preferably 100° C. to 220° C., and more preferably 130° C. to 200° C.

The heat treatment time in the heat treatment step is preferably 20 seconds to 300 seconds, more preferably 30 seconds to 240 seconds, and even more preferably 40 seconds to 180 seconds.

The heat treatment in the heat treatment step may be a steam treatment known in the inkjet printing. However, from the viewpoint of simplification of the step, a heat treatment other than the steam treatment is preferable.

The heat treatment other than the steam treatment is preferably a heat treatment in which the fabric having an image formed thereon (that is, colored fabric) is heat-pressed. In the heat treatment of this aspect, the image in the colored fabric can be heat-treated by heat-pressing the colored fabric.

The heat-pressing can be performed using a known heat press machine.

As described above, even in a case where the steam treatment is omitted, an image having excellent optical density and rub resistance can be formed on a fabric by a heat treatment other than the steam treatment in the inkjet printing method A.

The inkjet printing method A may include a step other than the above steps.

Examples of other steps include known steps in the inkjet printing method, such as a posttreatment step of posttreating the colored fabric after the heat treatment step using a posttreatment agent.

<Fabric>

The inkjet printing method A can be applied to various types of fabrics.

Examples of the fiber type of the fabric include synthetic fibers such as nylon, polyester, and acrylonitrile; semi-synthetic fibers such as acetate and rayon; natural fibers such as cotton, silk, and wool; and mixed fibers consisting of two or more selected from the group consisting of the synthetic fibers, the semi-synthetic fibers, and the natural fibers.

The fiber type of the fabric is preferably at least one selected from cotton or polyester.

Examples of the aspect of the fabric include woven fabrics, knitted fabrics, and nonwoven fabrics.

The fabric may be a fabric for a fabric product.

Examples of the fabric product include clothing items (T-shirts, tracksuits, jerseys, pants, sweatsuits, dresses, and blouses), bedding, and handkerchiefs.

[Other Image Forming Methods]

Needless to say, the ink according to the embodiment of the present disclosure may be used for an image forming method other than the inkjet printing method A.

Examples of the image forming method other than the inkjet printing method A include a method in which the fabric in the inkjet printing method A is changed to a base material other than the fabric.

Examples of the base material other than the fabric include a plastic base material.

Examples of the plastic of the plastic base material include a polyvinyl chloride (PVC) resin, cellulose diacetate, cellulose triacetate, cellulose propionate, cellulose butyrate, cellulose acetate butyrate, cellulose nitrate, polyethylene terephthalate (PET), polyethylene (PE), polystyrene (PS), polypropylene (PP), polycarbonate (PC), polyvinyl acetal, and an acrylic resin.

The plastic base material may be corona-treated.

With the ink according to the embodiment of the present disclosure, an image having excellent adhesiveness can be formed not only on a general plastic base material such as a PET base material, but also on a base material in which it is difficult to secure adhesiveness to an image formed by an aqueous ink.

Examples of the base material in which it is difficult to secure adhesiveness to an image formed by an aqueous ink include a hydrophobic base material having no polar group.

Examples of the hydrophobic base material having no polar group include a PS base material, a corona-treated PP base material (may be referred to as "corona PP"), a PE base material, and a PE-laminated paper base material.

EXAMPLES

Hereinafter, examples of the present disclosure will be described. The present disclosure is not limited to the following examples.

Example 1

<Synthesis of Polymer P>

In a three-neck flask,
55.07 g of trimethylhexamethylene diisocyanate (TMHDI) as a compound for forming a unit (1),
6.87 g of 2,2-dimethylolpropionic acid (DMPA) as a compound for introducing a hydrophilic group,
12.33 g of ethylene glycol (that is, compound (2-1)) as a compound for forming a unit (2), and
49.52 g of ethyl acetate
were charged and heated to 70° C.

Next, 0.247 g of NEOSTANN U-600 (manufactured by NITTO KASEI CO., LTD., inorganic bismuth catalyst; hereinafter, also referred to as "U-600") was added to the three-neck flask, and the mixture was stirred at 70° C. for 5 hours.

Next, 218.0 g of isopropyl alcohol and 197.0 g of ethyl acetate were added thereto, and the mixture was stirred at 70° C. for 3 hours.

The reaction liquid after stirring for 3 hours was left to cool to room temperature (23° C.), and then the concentration thereof was adjusted with ethyl acetate to obtain a 30 mass % solution of a polymer P (the solvent was a mixed solution of ethyl acetate/isopropyl alcohol).

A part of the above-described amount of the isopropyl alcohol also functions as a terminal sealing agent for the polymer P.

Table 1 shows the type, Mw, Tg (° C.), and acid value (mmol/g) of the compound (raw material) for forming each unit in the polymer P.

<Preparation of Colored Resin Particle Dispersion>

(Preparation of Oil Phase Component)

Ethyl acetate, the 30 mass % solution of the polymer P, and C. I. Solvent Black 28 (hereinafter, also referred to as "SB28") as an oil-soluble dye (specifically, a black dye which is a chromium complex dye) were mixed and stirred for 15 minutes to obtain 149.8 g of an oil phase component having a solid content of 30 mass %.

In the preparation of the oil phase component, the amounts of the 30 mass % solution of the polymer P and SB28 used were adjusted so that the content (in Table 1, referred to as "amount (mass %)") of the polymer P with respect to the solid content of colored resin particles to be manufactured was 40 mass %, the content (in Table 1, referred to as "amount (mass %)") of SB28 with respect to the solid content of colored resin particles to be manufactured was 60 mass %, and the mass ratio [P/dye] (that is, the mass ratio of the content of the polymer P to the content of the oil-soluble dye) in colored resin particles to be manufactured was 0.67.

(Preparation of Water Phase Component)

A water phase component was prepared by mixing 135.3 g of distilled water and sodium hydroxide as a neutralizing agent and stirring the mixture for 15 minutes.

The amount of the sodium hydroxide used as a neutralizing agent was adjusted such that the degree of neutralization (that is, the ratio of the number of sodium salts of carboxyl groups to the total number of sodium salts of carboxyl groups and the carboxyl groups) was 90% in colored resin particles to be manufactured.

(Preparation of Colored Resin Particle Dispersion)

The oil phase component and the water phase component were mixed, and the obtained mixture was emulsified at 18,000 rpm for 10 minutes using a homogenizer at room temperature to obtain an emulsion. The obtained emulsion was added to 48.0 g of distilled water, and the obtained liquid was heated to 50° C. and stirred at 50° C. for 5 hours to distill off the ethyl acetate and isopropyl alcohol from the liquid.

The liquid in which the ethyl acetate and isopropyl alcohol were distilled off was diluted with distilled water so that the solid content was 20 mass %, and thus a black colored resin particle dispersion containing colored resin particles and water was obtained.

Table 1 shows the volume average particle diameter (in Table 1, simply referred to as "particle diameter (nm)") of the colored resin particles in the colored resin particle dispersion.

<Preparation of Ink>

The colored resin particle dispersion, the following surfactant, glycerin, and distilled water were mixed, and the obtained mixture was filtered with a membrane filter (pore diameter: 1 μm) made of polytetrafluoroethylene (PTFE) to obtain an ink having the following composition. The ink of Example 1 is a black ink.

—Composition of Ink—
Solid Content of Colored Resin Particles (that is, solid content in the colored resin particle dispersion) . . . 10 parts by mass
Surfactant ("OLFINE E1010" manufactured by Nissin Chemical Industry Co., Ltd.) . . . 1 part by mass
Glycerin . . . 20 parts by mass
Distilled Water . . . 69 parts by mass <Inkjet Printing>

Inkjet printing including: forming an image by applying the ink to a fabric to obtain a colored fabric; and heat-treating the obtained colored fabric was performed.

As the fabric, a pretreated cotton fabric was used.

The details will be shown below.

(Pretreatment of Cotton Fabric)

The pretreatment of the cotton fabric was performed as follows.

PAS-H-1L (aggregating agent, manufactured by Nittobo Medical Co., Ltd., solid content: 28 mass %) (100 parts by mass), BYK348 (manufactured by BYK JAPAN KK) (5 parts by mass), 2-pyrrolidone (50 parts by mass), glycerin (50 parts by mass), and water (845 parts by mass) were mixed and stirred to prepare an aqueous pretreatment liquid.

The aqueous pretreatment liquid was permeated into a cotton fabric (cotton broadcloth 40, manufactured by Shiki-sensha CO., LTD.) by a padding method with a squeezing ratio of 70%, and dried for 24 hours.

Here, the squeezing ratio (%) represents the residual amount (mass ratio) of the aqueous pretreatment liquid with respect to the fabric after squeezing the fabric including the aqueous pretreatment liquid.

(Application of Ink)

Using an inkjet printer (PX-045A, manufactured by Seiko Epson Corporation), the ink was applied to the above-described pretreated cotton fabric to form a solid image, and a colored fabric was obtained.

(Heat Treatment (Heat-Pressing))

The colored fabric was dried at 20° C. for 12 hours.

The colored fabric after drying was heat-treated at 140° C. for 120 seconds using a heat press machine (desktop automatic flat press machine AF-54TEN, manufactured by Asahi Garment Machinery Co., Ltd.). Accordingly, the solid image in the colored fabric after drying was heat-treated.

<Evaluation>

The following evaluation was performed using the ink and the colored fabric after the heat treatment.

The results are shown in Table 1.

(Optical Density of Image)

The optical density (optical density (OD) value) of the colored fabric after the heat treatment was measured, and the optical density of the image in the colored fabric after the heat treatment was evaluated according to the following evaluation criteria.

The OD value was measured using a colorimeter (Gretag Macbeth Spectrolino, manufactured by X-Rite, Inc.).

In the following evaluation criteria, the highest optical density of the image is represented by level SSS.

—Criteria for Evaluation of Optical Density of Image—
SSS: The OD value is 1.7 or greater.
SS: The OD value is 1.6 or greater and less than 1.7.
S: The OD value is 1.4 or greater and less than 1.6.
A: The OD value is 1.2 or greater and less than 1.4.
B: The OD value is 1.0 or greater and less than 1.2.
C: The OD value is 0.8 or greater and less than 1.0.
D: The OD value is less than 0.8.

(Rub Resistance of Image)

The rub resistance of the image in the colored fabric after the heat treatment was evaluated based on ISO 105-X12.

The rub resistance of the image was evaluated under dry conditions and wet conditions, respectively.

Here, the dry condition (in Table 1, simply written as "dry") means that the rubbing is performed with dry white cloth containing no water, and the wet condition (in Table 1, simply written as "wet") means that the rubbing is performed with white cloth containing water.

In the results of the evaluation of the rub resistance of the image, the highest rub resistance of the image is represented by level 5.

(Light Resistance of Image)

The light resistance of the image in the colored fabric after the heat treatment was evaluated based on ISO 105-B02 using a light resistance and weather fastness tester of a xenon arc lamp type.

In the results of the evaluation of the light resistance of the image, the highest light resistance of the image is represented by level 5.

(Perspiration Resistance of Image)

The perspiration resistance of the image in the colored fabric after the heat treatment was evaluated based on ISO 105-E04.

The perspiration resistance of the image was evaluated using acidic perspiration (hereinafter, simply referred to as "acid") and alkaline perspiration (hereinafter, simply referred to as "alkaline").

In the results of the evaluation of the perspiration resistance of the image, the highest perspiration resistance of the image is represented by level 5.

(Washing Resistance of Image)

The washing resistance of the image in the colored fabric after the heat treatment was evaluated based on ISO 105-006.

In the results of the evaluation of the washing resistance of the image, the highest washing resistance of the image is represented by level 5.

(Dry Cleaning Resistance of Image)

The dry cleaning resistance (hereinafter, also referred to as "DC resistance") of the image in the colored fabric after the heat treatment was evaluated based on ISO 105-D01.

In the results of the evaluation of the DC resistance of the image, the highest DC resistance of the image is represented by level 5.

In the results of the evaluation about the rub resistance, perspiration resistance, washing resistance, and DC resistance in Tables 1 to 3, "1-2" means that the level is higher than 1 and lower than 2, "2-3" means that the level is higher than 2 and lower than 3, "3-4" means that the level is higher than 3 and lower than 4, and "4-5" means that the level is higher than 4 and lower than 5.

(Jetting Property of Ink)

The jetting property of the ink was evaluated as an indicator of the dispersion stability of the colored resin particles in the colored resin particle dispersion. The details will be shown below.

The ink stored at room temperature within 1 day after the preparation was ejected for 30 minutes from a head of an inkjet printer (manufactured by FUJIFILM Dimatix, Inc., DMP), and then the ejection was stopped. After 5 minutes from the stop of the ejection, the ink was ejected again from the head onto a polystyrene base material ("falcon hi impact polystyrene" manufactured by Robert Horne Group Ltd.) to form a solid image of 5 cm×5 cm.

The obtained solid image was visually observed to confirm whether dots were missed due to the occurrence of a non-ejection nozzle or the like, and the jetting property of the ink was evaluated according to the following evaluation criteria.

In the following evaluation criteria, the highest jetting property of the ink is represented by level A.

—Criteria for Evaluation of Jetting Property—
- A: Dot omission due to the occurrence of a non-ejection nozzle or the like was not confirmed, and a satisfactory image was obtained.
- B: Dot omission due to the occurrence of a non-ejection nozzle or the like was slightly confirmed, but the dot omission did not cause any problems in practical use.
- C: Dot omission due to the occurrence of a non-ejection nozzle or the like was generated, and the image was not able to be used in practice.
- D: The ink was not able to be ejected from the head.

(Storage Stability of Ink)

The storage stability of the ink was evaluated as an index of the dispersion stability of the colored resin particles in the colored resin particle dispersion. The details will be shown below.

The ink stored at room temperature within 1 day after the preparation was sealed in a container and left at 50° C. for 4 weeks.

Using the ink after 4 weeks, the evaluation was performed in the same manner as in the evaluation of the jetting property.

Examples 2 to 21

In Examples 2 to 18 and 19 to 21 (that is, Examples other than Examples 18-2 and 18-3 to be described later), the operation was performed in the same manner as in Example 1, except for the following points.

The results are shown in Table 1.

—Changes from Example 1—
- In the synthesis of the polymer P, the combination of the type of the compound for twilling a unit (1) and the type of the compound for forming a unit (2) was changed as shown in Table 1 without changing the total mass of the compound for forming a unit (1) and the compound for forming a unit (2) used and the molar ratio [compound for twining a unit (2)/compound for twining a unit (1)].
- The reaction conditions (reaction temperature and reaction time) were adjusted so that the weight-average molecular weight of the polymer P was 15,000.

In Table 1, the details of the compounds such as HDI and (2-1) shown in the column of the compound for forming a unit (1) and in the column of the compound for forming a unit (2) are as described above.

The number-average molecular weight (Mn) of the compound "(2-16) PPG" (polypropylene glycol) used in Example 3 is 1,000.

The compounds "(2-17) PEs" (polyester diol) used in Examples 4 and 5 are respectively Polyol P-1010 [in the table, written as "P1010". Mn is 1,000. Ra is an alkylene group having 4 carbon atoms (specifically, a group derived from adipic acid), and Rb$^1$ and Rb$^2$ each are an alkylene group having 6 carbon atoms (specifically, a group derived from 3-methylpentanediol)] manufactured by Kuraray Co., Ltd., and Polyol P-1012 [in the table, written as "P1012". Mn is 1,000. Ra is an alkylene group having 4 carbon atoms (specifically, a group derived from adipic acid) or a phenylene group (specifically, a group derived from terephthalic acid) (some of plural Ra's are groups derived from adipic acid, and the remaining Ra's are groups derived from terephthalic acid), and Rb$^1$ and Rb$^2$ each are an alkylene group having 6 carbon atoms (specifically, a group derived from 3-methylpentanediol)] manufactured by Kuraray Co., Ltd.

The compound "(2-19) PCL" (polycaprolactone diol) used in Example 6 is PLACCEL (registered trademark) 212 (Mn is 1,250) manufactured by DAICEL CORPORATION.

The PBD (polybutadiene diol) used in Example 7 is NISSO-PB (registered trademark) G-1000 (Mn is 1,400) manufactured by Nippon Soda Co., Ltd.

The PIPs used in Examples 8 and 9 are respectively
Poly ip (Mn is 2,500) manufactured by Idemitsu Kosan Co., Ltd., and
EPOL (Mn is 2,500) manufactured by Idemitsu Kosan Co., Ltd.

The compounds "(2-18) PC" (polycarbonate diol) used in Examples 17 to 21 are respectively DURANOL (registered trademark) T5650 (in the table, simply written as "T5650". Mn is 500. Rc$^1$ and Rc$^2$ each are an alkylene group having 5 or 6 carbon atoms) manufactured by Asahi Kasei Corporation, DURANOL (registered trademark) T5651 (in the table, simply written as "T5651". Mn is 1,000. Rc$^1$ and Rc$^2$ each are an alkylene group having 5 or 6 carbon atoms) manufactured by Asahi Kasei Corporation, DURANOL (registered trademark) T5652 (in the table, simply written as "T5652". Mn is 2,000. Rc$^1$ and Rc$^2$ each are an alkylene group having 5 or 6 carbon atoms) manufactured by Asahi Kasei Corporation, DURANOL (registered trademark) T3451 (in the table, simply written as "T3451". Mn is 1,000. Rc$^1$ and Rc$^2$ each are an alkylene group having 3 or 4 carbon atoms) manufactured by Asahi Kasei Corporation, and C1090 (in the table, simply written as "C1090". Mn is 1,000. Rc$^1$ and Rc$^2$ each are an alkylene group having 6 carbon atoms (a group derived from 3-methylpentanediol)) manufactured by Kuraray Co., Ltd.

In Example 18-2, the operation was performed in the same manner as in Example 18, except that in the preparation of the ink, a part of the colored resin particle dispersion was replaced with a carbon black pigment dispersion liquid (CAB-O-JET (registered trademark) 300 manufactured by CABOT Corporation) to change the composition of the ink as follows.

The results are shown in Table 1.

—Composition of Ink (Example 18-2)—
- Solid Content of Colored Resin Particles (that is, solid content in the colored resin particle dispersion) . . . 9 parts by mass
- Carbon Black Pigment (that is, solid content in CAB-O-JET (registered trademark) 300) . . . 1 part by mass
- Surfactant ("OLFINE E1010" manufactured by Nissin Chemical Industry Co., Ltd.) . . . 1 part by mass
- Glycerin . . . 20 parts by mass
- Distilled Water . . . 69 parts by mass In Example 18-3, the operation was performed in the same manner as in Example 18, except that in the preparation of the ink, a part of the distilled water was replaced with POLYLON L788 (polyethylene wax aqueous dispersion) manufactured by CHUKYO YUSHI CO., LTD to change the composition of the ink as follows.

The results are shown in Table 1.

—Composition of Ink (Example 18-3)—
- Solid Content of Colored Resin Particles (that is, solid content in the colored resin particle dispersion) . . . 10 parts by mass
- Surfactant ("OLFINE E1010" manufactured by Nissin Chemical Industry Co., Ltd.) . . . 1 part by mass
- Polyethylene Wax (that is, solid content in POLYLON L788) . . . 1 part by mass
- Glycerin . . . 20 parts by mass Distilled Water . . . 68 parts by mass Examples 22 to 26

The operation was performed in the same manner as in Example 18, except for the following points.
The results are shown in Table 2.
—Changes from Example 18—
In the synthesis of the polymer P, the ratio between the total mass of the compound for forming a unit (1) and the compound for forming a unit (2) used and the mass of the monomer for introducing a hydrophilic group used was changed without changing the molar ratio [compound for forming a unit (2)/compound for forming a unit (1)] to change the acid value of the polymer P as shown in Table 2.
The reaction conditions (that is, the reaction temperature and the reaction time) were adjusted so that the weight-average molecular weight of the polymer P was 15,000.

Examples 27 to 29

The operation was performed in the same manner as in Example 18, except for the following points.
The results are shown in Table 2.
—Changes from Example 18—
The reaction conditions (that is, the reaction temperature and the reaction time) were adjusted so that the weight-average molecular weight of the polymer P was as shown in Table 2.

Examples 30 to 39

The operation was performed in the same manner as in Example 18, except that the type of the oil-soluble dye was changed as shown in Table 2.
The results are shown in Table 2.
The details of the oil-soluble dyes in Tables 1 to 3 are as follows.
SB28 . . . C. I. Solvent Black 28 (black dye, chromium complex dye)
SB3 . . . C. I. Solvent Black 3 (black dye, disazo dye)
MA-2 . . . The above-described compound (MA-2) (a specific example of the compound represented by Formula (M-A-1)) (black dye, disazo dye)
SB7 . . . C. I. Solvent Black 7 (black dye, nigrosine iron complex dye)
SB27 . . . C. I. Solvent Black 27 (black dye, chromium complex dye)
SB29 . . . C. I. Solvent Black 29 (black dye, chromium complex dye)
SR122 . . . C. I. Solvent Red 122 (red dye, chromium complex dye)
Sblue 70 . . . C. I. Solvent Blue 70 (blue dye, copper complex dye)
SY42 . . . C. I. Solvent Yellow 42 (yellow dye, disazo dye)
The mass ratio [SB28/SB3] in Example 38 was 54/6, and the mass ratio [SB28/SY42] in Example 39 was 54/6.
Example 35 is an example using a red dye, a red colored resin particle dispersion, and a red ink, Example 36 is an example using a blue dye, a blue colored resin particle dispersion, and a blue ink, and Example 37 is an example using a yellow dye, a yellow colored resin particle dispersion, and a yellow ink.

Examples 40 to 43

The operation was performed in the same manner as in Example 18, except that the mass ratio of the content of the polymer P to the content of the oil-soluble dye in the colored resin particles (in Tables 1 to 3, "mass ratio [P/dye]") was changed as shown in Table 3.
The results are shown in Table 3.

Comparative Examples 1 and 2

The operation was performed in the same manner as in Example 32, except for the following points.
The results are shown in Table 3.
—Changes from Example 32—
In the synthesis of the polymer P, the combination of the type of the compound for forming a unit (1) and the type of the compound for forming a unit (2) was changed as shown in Table 3 without changing the total mass of the compound for forming a unit (1) and the compound for forming a unit (2) used and the molar ratio [compound for forming a unit (2)/compound for forming a unit (1)].
The reaction conditions (reaction temperature and reaction time) were adjusted so that the weight-average molecular weight of the polymer P was 15,000.
Among the raw materials used in Comparative Examples 1 and 2, HXDI, IPDI, and TCD are all comparative compounds, and their structures are as follows.

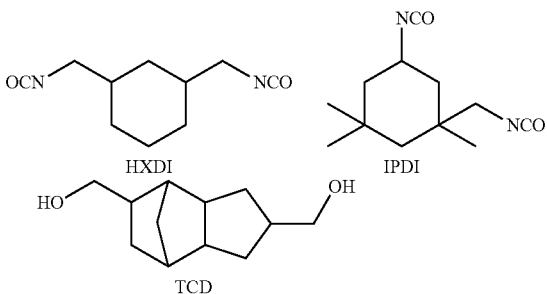

Comparative Example 3

The operation was performed in the same manner as in Example 1, except that in the preparation of the ink, the colored resin particle dispersion (10 parts by mass as the solid content) was changed to a commercially available carbon black pigment dispersion liquid (CAB-O-JET (registered trademark) 352K manufactured by CABOT Corporation) (10 parts by mass as the amount of the carbon black pigment).
The results are shown in Table 3.
Here, the carbon black pigment in the carbon black pigment dispersion liquid is a comparative coloring agent.

Comparative Example 4

In the preparation of the colored resin particle dispersion, the operation was performed in the same manner as in Example 31, except that the oil-soluble dye was changed to an acid dye of the same mass (C. I. Acid Black 234; hereinafter, also referred to as "AB234").
The results are shown in Table 3.
Here, the acid dye is water-soluble and is a comparative coloring agent which does not correspond to an oil-soluble dye.

Comparative Example 5

The operation was performed in the same manner as in Example 32, except that in the preparation of the colored resin particle dispersion, the 30 mass % solution of the polymer P was changed to a 30 mass % ethyl acetate solution of sodium salt of β-naphthalene sulfonic acid formalin condensate ("DEMOL (registered trademark) N" manufactured by Kao Corporation; water-soluble dispersant) of the same mass.

The results are shown in Table 3.

TABLE 1

| | Colored Resin Particles | | | | | | | | | | |
|---|---|---|---|---|---|---|---|---|---|---|---|
| | Polymer P or Comparative Compound | | | | | | | Oil-soluble Dye or Comparative Coloring Agent | | | |
| | Raw Materials | | | Polymer Properties | | | | | Type | | Mass |
| | Compound for Introducing Hydrophilic Group | Compound for Forming Unit (1) | Compound for Forming Unit (2) | Mw | Tg (° C.) | Acid Value (mmol/g) | Amount (mass %) | Color | Classification | Type | Amount (mass %) | Ratio [P/dye] |
| Example 1 | DMPA | TMHDI | (2-1) | 15000 | 60 | 0.69 | 40% | Black | Chromium complex | SB28 | 60% | 0.67 |
| Example 2 | DMPA | TMHDI | (2-5) | 15000 | 40 | 0.69 | 40% | Black | Chromium complex | SB28 | 60% | 0.67 |
| Example 3 | DMPA | HDI | (2-16) PPG | 15000 | −30 | 0.69 | 40% | Black | Chromium complex | SB28 | 60% | 0.67 |
| Example 4 | DMPA | HDI | (2-17) PEs, P1012 | 15000 | −5 | 0.69 | 40% | Black | Chromium complex | SB28 | 60% | 0.67 |
| Example 5 | DMPA | HDI | (2-17) PEs, P1010 | 15000 | −25 | 0.69 | 40% | Black | Chromium complex | SB28 | 60% | 0.67 |
| Example 6 | DMPA | HDI | (2-19) PCL | 15000 | −20 | 0.69 | 40% | Black | Chromium complex | SB28 | 60% | 0.67 |
| Example 7 | DMPA | HDI | PBD | 15000 | −20 | 0.69 | 40% | Black | Chromium complex | SB28 | 60% | 0.67 |
| Example 8 | DMPA | HDI | PIP, Poly ip | 15000 | −30 | 0.69 | 40% | Black | Chromium complex | SB28 | 60% | 0.67 |
| Example 9 | DMPA | HDI | PIP, EPOL | 15000 | −30 | 0.69 | 40% | Black | Chromium complex | SB28 | 60% | 0.67 |
| Example 10 | DMPA | HDI | (2-6) | 15000 | 45 | 0.69 | 40% | Black | Chromium complex | SB28 | 60% | 0.67 |
| Example 11 | DMPA | HDI | (2-7) | 15000 | 40 | 0.69 | 40% | Black | Chromium complex | SB28 | 60% | 0.67 |
| Example 12 | DMPA | HDI | (2-8) | 15000 | 35 | 0.69 | 40% | Black | Chromium complex | SB28 | 60% | 0.67 |
| Example 13 | DMPA | HDI | (2-9) | 15000 | 20 | 0.69 | 40% | Black | Chromium complex | SB28 | 60% | 0.67 |
| Example 14 | DMPA | HDI | (2-10) | 15000 | 25 | 0.69 | 40% | Black | Chromium complex | SB28 | 60% | 0.67 |
| Example 15 | DMPA | HDI | (2-11) | 15000 | 10 | 0.69 | 40% | Black | Chromium complex | SB28 | 60% | 0.67 |
| Example 16 | DMPA | HDI | (2-15) | 15000 | 30 | 0.69 | 40% | Black | Chromium complex | SB28 | 60% | 0.67 |
| Example 17 | DMPA | HDI | (2-18) PC T5650 | 15000 | 0 | 0.69 | 40% | Black | Chromium complex | SB28 | 60% | 0.67 |
| Example 18 | DMPA | HDI | (2-18) PC T5651 | 15000 | −20 | 0.69 | 40% | Black | Chromium complex | SB28 | 60% | 0.67 |
| Example 18-2 | DMPA | HDI | (2-18) PC T5651 | 15000 | −20 | 0.69 | 40% | Black | Chromium complex | SB28 | 60% | 0.67 |
| Example 18-3 | DMPA | HDI | (2-18) PC T5651 | 15000 | −20 | 0.69 | 40% | Black | Chromium complex | SB28 | 60% | 0.67 |
| Example 19 | DMPA | HDI | (2-18) PC T5652 | 15000 | −40 | 0.69 | 40% | Black | Chromium complex | SB28 | 60% | 0.67 |
| Example 20 | DMPA | HDI | (2-18) PCD T3451 | 15000 | −20 | 0.69 | 40% | Black | Chromium complex | SB28 | 60% | 0.67 |
| Example 21 | DMPA | HDI | (2-18) PC C1090 | 15000 | −20 | 0.69 | 40% | Black | Chromium complex | SB28 | 60% | 0.67 |

TABLE 1-continued

| | Colored Resin Particles Particle Diameter (nm) | Evaluation Results | | | | | | | | | |
|---|---|---|---|---|---|---|---|---|---|---|---|
| | | Optical Density | Rub Resistance Dry | Rub Resistance Wet | Light Resistance | Perspiration Resistance Acid | Perspiration Resistance Alkaline | Washing Resistance | DC Resistance | Jetting Property | Storage Stability |
| Example 1 | 150 | S | 3 | 2-3 | 4 | 4-5 | 4-5 | 4-5 | 4-5 | B | B |
| Example 2 | 150 | SS | 3 | 2-3 | 4 | 4-5 | 4-5 | 4-5 | 4-5 | A | A |
| Example 3 | 150 | SS | 3 | 2-3 | 4 | 4-5 | 4-5 | 4-5 | 4-5 | A | A |
| Example 4 | 150 | SS | 3 | 2-3 | 4 | 4-5 | 4-5 | 4-5 | 4-5 | A | A |
| Example 5 | 150 | SS | 3 | 2-3 | 4 | 4-5 | 4-5 | 4-5 | 4-5 | A | A |
| Example 6 | 150 | SS | 3 | 2-3 | 4 | 4-5 | 4-5 | 4-5 | 4-5 | A | A |
| Example 7 | 150 | SS | 3 | 2-3 | 4 | 4-5 | 4-5 | 4-5 | 4-5 | A | A |
| Example 8 | 150 | SS | 3 | 2-3 | 4 | 4-5 | 4-5 | 4-5 | 4-5 | A | A |
| Example 9 | 150 | SS | 3 | 2-3 | 4 | 4-5 | 4-5 | 4-5 | 4-5 | A | A |
| Example 10 | 150 | SS | 3-4 | 3 | 4 | 4-5 | 4-5 | 4-5 | 4-5 | A | A |
| Example 11 | 150 | SSS | 4 | 3-4 | 4 | 4-5 | 4-5 | 4-5 | 4-5 | A | A |
| Example 12 | 150 | SSS | 4 | 3-4 | 4 | 4-5 | 4-5 | 4-5 | 4-5 | A | A |
| Example 13 | 150 | SSS | 4 | 3-4 | 4 | 4-5 | 4-5 | 4-5 | 4-5 | A | A |
| ExamplE 14 | 150 | SSS | 4 | 3-4 | 4 | 4-5 | 4-5 | 4-5 | 4-5 | A | A |
| Example 15 | 150 | SSS | 4 | 3-4 | 4 | 4-5 | 4-5 | 4-5 | 4-5 | A | A |
| Example 16 | 150 | SSS | 4 | 3-4 | 4 | 4-5 | 4-5 | 4-5 | 4-5 | A | A |
| Example 17 | 150 | SSS | 4-5 | 4 | 4 | 4-5 | 4-5 | 4-5 | 4-5 | A | A |
| Example 18 | 150 | SSS | 4-5 | 4 | 4 | 4-5 | 4-5 | 4-5 | 4-5 | A | A |
| Example 18-2 | 150 | SSS | 4-5 | 4 | 4 | 4-5 | 4-5 | 4-5 | 4-5 | A | A |
| Example 18-3 | 150 | SSS | 5 | 4-5 | 4 | 4-5 | 4-5 | 4-5 | 4-5 | A | A |
| Example 19 | 150 | SSS | 4-5 | 4 | 4 | 4-5 | 4-5 | 4-5 | 4-5 | A | A |
| Example 20 | 150 | SSS | 4-5 | 4 | 4 | 4-5 | 4-5 | 4-5 | 4-5 | A | A |
| Example 21 | 150 | SSS | 4-5 | 4 | 4 | 4-5 | 4-5 | 4-5 | 4-5 | A | A |

TABLE 2

| | Colored Resin Particles | | | | | | | | | |
|---|---|---|---|---|---|---|---|---|---|---|
| | Polymer P or Comparative Compound | | | | | | Oil-soluble Dye or Comparative Coloring Agent | | | |
| | Raw Materials | | | Polymer Properties | | | | | Type | |
| | Compound for Introducing Hydrophilic Group | Compound for Forming Unit (1) | Compound for Forming Unit (2) | Mw | Tg (° C.) | Acid Value (mmol/g) | Amount (mass %) | Color | Classification | Type | Amount (mass %) |
| Example 22 | DMPA | HDI | (2-18) PC T5651 | 15000 | −25 | 0.20 | 40% | Black | Chromium complex | SB28 | 60% |
| Example 23 | DMPA | HDI | (2-18) PC T5651 | 15000 | −20 | 0.40 | 40% | Black | Chromium complex | SB28 | 60% |
| Example 24 | DMPA | HDI | (2-18) PC T5651 | 15000 | −10 | 1.00 | 40% | Black | Chromium complex | SB28 | 60% |
| Example 25 | DMPA | HDI | (2-18) PC T5651 | 15000 | 0 | 1.30 | 40% | Black | Chromium complex | SB28 | 60% |
| Example 26 | DMPA | HDI | (2-18) PC T5651 | 15000 | 20 | 1.60 | 40% | Black | Chromium complex | SB28 | 60% |
| Example 27 | DMPA | HDI | (2-18) PC T5651 | 6000 | −20 | 0.69 | 40% | Black | Chromium complex | SB28 | 60% |
| Example 28 | DMPA | HDI | (2-18) PC T5651 | 25000 | −20 | 0.69 | 40% | Black | Chromium complex | SB28 | 60% |
| Example 29 | DMPA | HDI | (2-18) PC T5651 | 50000 | −20 | 0.69 | 40% | Black | Chromium complex | SB28 | 60% |
| Example 30 | DMPA | HDI | (2-18) PC T5651 | 15000 | −20 | 0.69 | 40% | Black | Disazo | SB3 | 60% |

TABLE 2-continued

| | | | | | | | | | | | |
|---|---|---|---|---|---|---|---|---|---|---|---|
| Example 31 | DMPA | HDI | (2-18) PC T5651 | 15000 | −20 | 0.69 | 40% | Black | Disazo | MA-2 | 60% |
| Example 32 | DMPA | HDI | (2-18) PC T5651 | 15000 | −20 | 0.69 | 40% | Black | Nigrosine iron complex | SB7 | 60% |
| Example 33 | DMPA | HDI | (2-18) PC T5651 | 15000 | −20 | 0.69 | 40% | Black | Chromium complex | SB27 | 60% |
| Example 34 | DMPA | HDI | (2-18) PC T5651 | 15000 | −20 | 0.69 | 40% | Black | Chromium complex | SB29 | 60% |
| Example 35 | DMPA | HDI | (2-18) PC T5651 | 15000 | −20 | 0.69 | 40% | Red | Chromium complex | SR122 | 60% |
| Example 36 | DMPA | HDI | (2-18) PC T5651 | 15000 | −20 | 0.69 | 40% | Blue | Copper complex | Sblue 70 | 60% |
| Example 37 | DMPA | HDI | (2-18) PC T5651 | 15000 | −20 | 0.69 | 40% | Yellow | Disazo | SY42 | 60% |
| Example 38 | DMPA | HDI | (2-18) PC T5651 | 15000 | −20 | 0.69 | 40% | Black/ black | Chromium complex/ disazo | SB28/ SB3 | 60% |
| Example 39 | DMPA | HDI | (2-18) PC T5651 | 15000 | −20 | 0.69 | 40% | Black/ yellow | Chromium complex/ disazo | SB28/ SY42 | 60% |

| | Colored Resin Particles | | | Evaluation Results | | | | | | | | |
|---|---|---|---|---|---|---|---|---|---|---|---|---|
| | Mass Ratio [P/dye] | Particle Diameter (nm) | Optical Density | Rub Resistance | | Light Resistance | Perspiration Resistance | | Washing Resistance | DC Resistance | Jetting Property | Storage Stability |
| | | | | Dry | Wet | | Acid | Alkaline | | | | |
| Example 22 | 0.67 | 250 | SSS | 4-5 | 4 | 4 | 4-5 | 4-5 | 4-5 | 4-5 | B | B |
| Example 23 | 0.67 | 150 | SSS | 4-5 | 4 | 4 | 4-5 | 4-5 | 4-5 | 4-5 | A | A |
| Example 24 | 0.67 | 150 | SSS | 4-5 | 4 | 4 | 4-5 | 4-5 | 4-5 | 4-5 | A | A |
| Example 25 | 0.67 | 150 | SSS | 4-5 | 4 | 4 | 4-5 | 4-5 | 4-5 | 4-5 | A | A |
| Example 26 | 0.67 | 150 | SSS | 4-5 | 4 | 4 | 4-5 | 4-5 | 4-5 | 4-5 | B | B |
| Example 27 | 0.67 | 150 | SSS | 4 | 3-4 | 4 | 4-5 | 4-5 | 4-5 | 4-5 | B | B |
| Example 28 | 0.67 | 150 | SSS | 4-5 | 4 | 4 | 4-5 | 4-5 | 4-5 | 4-5 | A | A |
| Example 29 | 0.67 | 150 | SSS | 4-5 | 4 | 4 | 4-5 | 4-5 | 4-5 | 4-5 | B | B |
| Example 30 | 0.67 | 150 | SS | 4 | 3-4 | 4 | 3-4 | 3-4 | 3-4 | 3-4 | A | A |
| Example 31 | 0.67 | 150 | SS | 4 | 3-4 | 4 | 3-4 | 3-4 | 3-4 | 3-4 | A | A |
| Example 32 | 0.67 | 150 | S | 4-5 | 4 | 4 | 4 | 4 | 4 | 4 | A | A |
| Example 33 | 0.67 | 150 | SSS | 4-5 | 4 | 4 | 4-5 | 4-5 | 4-5 | 4-5 | A | A |
| Example 34 | 0.67 | 150 | SSS | 4-5 | 4 | 4 | 4-5 | 4-5 | 4-5 | 4-5 | A | A |
| Example 35 | 0.67 | 150 | S | 4-5 | 4 | 4 | 4-5 | 4-5 | 4-5 | 4-5 | A | A |
| Example 36 | 0.67 | 150 | S | 4-5 | 4 | 4 | 4 | 4 | 4 | 4 | A | A |
| Example 37 | 0.67 | 150 | S | 4 | 3-4 | 3 | 3-4 | 3-4 | 3-4 | 3-4 | A | A |
| Example 38 | 0.67 | 150 | SSS | 4-5 | 4 | 4 | 4-5 | 4-5 | 4-5 | 4-5 | A | A |
| Example 39 | 0.67 | 150 | SSS | 4-5 | 4 | 4 | 4-5 | 4-5 | 4-5 | 4-5 | A | A |

TABLE 3

| | Colored Resin Particles | | | | | | | | | |
|---|---|---|---|---|---|---|---|---|---|---|
| | Polymer P or Comparative Compound | | | | | | Oil-soluble Dye or Comparative Coloring Agent | | | |
| | Raw Materials | | | Polymer Properties | | | | Type | | |
| | Compound for Introducing Hydrophilic Group | Compound for Forming Unit (1) | Compound for Forming Unit (2) | Mw | Tg (° C.) | Acid Value (mmol/g) | Amount (mass %) | Color | Classification | Type | Amount (mass %) |
| Example 40 | DMPA | HDI | (2-18) PC T5651 | 15000 | −20 | 0.69 | 20% | Black | Chromium complex | SB28 | 80% |
| Example 41 | DMPA | HDI | (2-18) PC T5651 | 15000 | −20 | 0.69 | 30% | Black | Chromium complex | SB28 | 70% |
| Example 42 | DMPA | HDI | (2-18) PC T565I | 15000 | −20 | 0.69 | 60% | Black | Chromium complex | SB28 | 40% |
| Example 43 | DMPA | HDI | (2-18) PC T5651 | 15000 | −20 | 0.69 | 80% | Black | Chromium complex | SB28 | 20% |
| Comparative Example 1 | DMPA | HXDI | TCD | 15000 | 125 | 0.69 | 40% | Black | Nigrosine iron complex | SB7 | 60% |
| Comparative Example 2 | DMPA | IPDI | (2-1) | 15000 | 80 | 0.69 | 40% | Black | Nigrosine iron complex | SB7 | 60% |
| Comparative Example 3 | Using a commercially available carbon black pigment dispersion liquid | | | | | | | | | | |
| Comparative Example 4 | DMPA | HDI | (2-18) PC T5651 | 15000 | −20 | 0.69 | 40% | Black | Acid dye (water-soluble) | AB234 | 60% |
| Comparative Example 5 | DEMOL N sodium salt of β-naphthalene sulfonic acid formalin condensate | | | | | | 40% | Black | Nigrosine iron complex | SB7 | 60% |

| | Colored Resin Particles | | Evaluation Results | | | | | | | | |
|---|---|---|---|---|---|---|---|---|---|---|---|
| | Mass Ratio [P/dye] | Particle Diameter (nm) | Optical Density | Rub Resistance Dry | Rub Resistance Wet | Light Resistance | Perspiration Resistance Acid | Perspiration Resistance Alkaline | Washing Resistance | DC Resistance | Jetting Property | Storage Stability |
| Example 40 | 0.25 | 150 | SSS | 4-5 | 4 | 4 | 4-5 | 4-5 | 4-5 | 4-5 | B | B |
| Example 41 | 0.43 | 150 | SSS | 4-5 | 4 | 4 | 4-5 | 4-5 | 4-5 | 4-5 | A | A |
| Example 42 | 1.50 | 150 | SS | 4-5 | 4 | 4 | 4-5 | 4-5 | 4-5 | 4-5 | A | A |
| Example 43 | 4.00 | 150 | S | 4-5 | 4 | 4 | 4-5 | 4-5 | 4-5 | 4-5 | A | A |
| Comparative Example 1 | 0.67 | 150 | A | 2 | 1-2 | 3 | 2-3 | 2-3 | 2-3 | 2-3 | C | C |
| Comparative Example 2 | 0.67 | 150 | A | 2 | 1-2 | 3 | 2-3 | 2-3 | 2-3 | 2-3 | D | D |
| Comparative Example 3 | Using a commercially available carbon black pigment dispersion liquid | 150 | B | 1-2 | 1 | 4 | 4-5 | 4-5 | 4-5 | 4-5 | C | C |
| Comparative Example 4 | 0.67 | — | B | 1 | 1 | 2 | 1 | 1 | 1 | 1-2 | C | C |
| Comparative Example 5 | 0.67 | 400 | C | 1 | 1 | 2 | 1 | 1 | 1 | 1-2 | D | D |

As shown in Tables 1 to 3, the examples, each formed of a colored resin particle dispersion containing colored resin particles and water, in which the colored resin particles contained an oil-soluble dye and a polymer P containing a unit (1), a unit (2), and a hydrophilic group, were excellent in the optical density and rub resistance of the image. In addition, the examples were also excellent in the light resistance of the image, perspiration resistance of the image, washing resistance of the image, DC resistance of the image, jetting property of the ink, and storage stability of the ink.

Contrary to the examples, the comparative examples showed the following results.

In Comparative Example 1 in which the polymer in the colored resin particles did not contain the unit (1) and the unit (2) and in Comparative Example 2 in which the polymer in the colored resin particles did not contain the unit (1), the optical density and the rub resistance of the image were lowered as compared with Example 32 in which the same oil-soluble dye was used.

In Comparative Example 3 in which the colored resin particles contained only a comparative coloring agent (carbon black pigment), the optical density and the rub resistance of the image were lowered as compared with Example 1 and the like.

In Comparative Example 4 in which the colored resin particles contained only a comparative coloring agent (acid dye), the optical density and the rub resistance of the image were lowered as compared with Example 18 in which the same polymer P was used.

In Comparative Example 5 in which the colored resin particles contained only a comparative compound (DEMOL N) instead of the polymer P, the optical density and the rub resistance of the image were lowered as compared with Example 32 in which the same oil-soluble dye was used.

From the results of Examples 1 and 2, it is found that in a case where the glass transition temperature of the polymer is 50° C. or lower (Example 2), the optical density of the image is improved.

From the results of Examples 2 to 21, it is found that in a case where $L^2$ in Formula (1) is a chain hydrocarbon group having 4 to 25 carbon atoms and a branched structure, or a polymer chain having a number-average molecular weight of 500 or greater which consists of a polycarbonate chain (Examples 10 to 21), the rub resistance of the image is improved.

From the results of Examples 10 to 21, it is found that in a case where the chain hydrocarbon group having 4 to 25 carbon atoms and a branched structure is an unsubstituted branched alkylene group having 6 to 25 carbon atoms, an alkoxylated branched alkylene group having 6 to 25 carbon atoms, or an alkylcarbonyloxylated branched alkylene group having 6 to 25 carbon atoms, and the polycarbonate chain contains a plurality of alkylene groups having 2 to 12 carbon atoms and does not contain a cyclic structure (Examples 11 to 21), the optical density and rub resistance of the image are improved.

From the results of Examples 22 to 26, it is found that in a case where the acid value of the polymer P (that is, the total number of millimoles of the carboxyl group contained in 1 g of the polymer P and the salt of the carboxyl group) is 0.30 mmol/g to 1.50 mmol/g (Examples 23 to 25), the jetting property and the storage stability of the ink are improved.

From the results of Examples 27 to 29, it is found that in a case where the weight-average molecular weight (Mw) of the polymer P is 8,000 to 30,000 (Example 28), the jetting property and the storage stability of the ink are improved.

From the results of Examples 30 to 33, it is found that in a case where the oil-soluble dye contains at least one selected from the group consisting of a chromium complex dye and a disazo dye (Examples 30, 31, and 33), the optical density of the image is improved.

From the results of Examples 30, 31, and 33, it is found that in a case where the oil-soluble dye contains a chromium complex dye (Example 33), the optical density and the rub resistance of the image are improved.

From the results of Examples 40 to 43, it is found that in a case where the mass ratio [P/dye] (that is, the mass ratio of the content of the polymer P to the content of the oil-soluble dye) is 0.10 to 2.50 (Examples 40 to 42), the optical density of the image is improved, and in a case where the mass ratio [P/dye] is 0.25 to 1.00 (Examples 40 and 41), the optical density of the image is further improved.

[Evaluation Using Polystyrene (PS) Base Material]

Using the inks of Examples 1 to 21 and Comparative Examples 1 and 2, images were formed on a polystyrene (PS) base material, and the formed images were evaluated.

The details will be shown below.

<Pencil Hardness of Image>

By applying the ink stored at room temperature within 1 day after the preparation to a PS base material, a coating film (image) having a thickness of 2 μm was formed on the PS base material.

A polystyrene (PS) sheet ("falcon hi impact polystyrene" manufactured by Robert Home) was used as the PS base material. The application was performed using a No. 2 bar of K HAND COATER manufactured by RK Print Coat Instruments Ltd.

Next, the image was dried at 60° C. for 3 minutes. The image after drying was heat-treated for 3 minutes in an oven at 160° C. to fix the image on the PS base material.

The pencil hardness of the image after the heat treatment was measured based on JIS K5600-5-4 (1999). As the pencil used for measurement of the pencil hardness, UNI (registered trademark) manufactured by MITSUBISHIPENCIL CO., LTD. was used.

The results are shown in Table 4.

<Adhesiveness of Image>

By the method described in the evaluation of the pencil hardness of the image, an image was formed on a PS base material, and the image was heat-treated to be fixed on the PS base material.

A cross hatch test was performed on the image after fixing in conformity with ISO2409 (2013) (cross cut method), and the adhesiveness of the image to the PS base material was evaluated according to the following evaluation criteria.

The results are shown in Table 4.

In the cross hatch test, 25 square lattices of 1 mm square were formed with a cut interval of 1 mm. In the following evaluation criteria, 0 and 1 are practically acceptable levels. In the following evaluation criteria, a peeling rate (%) of lattices is a value obtained by the following expression. The total number of lattices in the following expression is 25.

Peeling Rate of Lattices (%)=[(Number of Lattices Peeled Off)/(Total Number of Lattices)]×100

—Criteria for Evaluation of Adhesiveness of Image—
0: The peeling rate (%) of lattices was 0%.
1: The peeling rate (%) of lattices was greater than 0% and 5% or less.
2: The peeling rate (%) of lattices was greater than 5% and 15% or less.
3: The peeling rate (%) of lattices was greater than 15% and 35% or less.
4: The peeling rate (%) of lattices was greater than 35% and 65% or less.
5: The peeling rate (%) of lattices was greater than 65%.

The PS base material is a hydrophobic base material having no polar group on the surface, and is thus different from a polyethylene terephthalate (PET) base material and a polyvinyl chloride (PVC) base material having a polar group on the surface. Accordingly, in the formation of an image using an aqueous ink, the PS base material is a base material in which the adhesiveness between an image and the base material is hardly obtained compared with a PET base material and a PVC base material. Accordingly, the evaluation of the adhesiveness of the cured film using the PS base material is adhesiveness evaluation under strict conditions. Therefore, the fact that the cured film has an excellent evaluation result in adhesiveness means that the adhesiveness of the cured film to the base material is extremely excellent.

<Optical Density of Image>

By the method described in the evaluation of the pencil hardness of the image, an image was formed on a PS base material, and the image was heat-treated to be fixed on the PS base material.

The OD value of the PS base material with the image fixed thereon was measured, and the optical density of the image was evaluated according to the same evaluation criteria as those for evaluation of the optical density of the image described in Example 1.

The results are shown in Table 4.

TABLE 4

| | Colored Resin Particles | | | | | | | |
|---|---|---|---|---|---|---|---|---|
| | Polymer P or Comparative Compound | | | | | | | |
| | Raw Materials | | | Polymer Properties | | | | Oil-soluble |
| | Compound for Introducing Hydrophilic Group | Compound for Forming Unit (1) | Compound for Forming Unit (2) | Mw | Tg (° C.) | Acid Value (mmol/g) | Amount (mass %) | Dye or Comparative Coloring Agent Color |
| Example 1 | DMPA | TMHDI | (2-1) | 15000 | 60 | 0.69 | 40% | Black |
| Example 2 | DMPA | TMHDI | (2-5) | 15000 | 40 | 0.69 | 40% | Black |
| Example 3 | DMPA | HDI | (2-16) PPG | 15000 | −30 | 0.69 | 40% | Black |
| Example 4 | DMPA | HDI | (2-17) PEs, P1012 | 15000 | −5 | 0.69 | 40% | Black |
| Example 5 | DMPA | HDI | (2-17) PEs, P1010 | 15000 | −25 | 0.69 | 40% | Black |
| Example 6 | DMPA | HDI | (2-19) PCL | 15000 | −20 | 0.69 | 40% | Black |
| Example 7 | DMPA | HDI | PBD | 15000 | −20 | 0.69 | 40% | Black |
| Example 8 | DMPA | HDI | PIP, Poly ip | 15000 | −30 | 0.69 | 40% | Black |
| Example 9 | DMPA | HDI | PIP, EPOL | 15000 | −30 | 0.69 | 40% | Black |
| Example 10 | DMPA | HDI | (2-6) | 15000 | 45 | 0.69 | 40% | Black |
| Example 11 | DMPA | HDI | (2-7) | 15000 | 40 | 0.69 | 40% | Black |
| Example 12 | DMPA | HDI | (2-8) | 15000 | 35 | 0.69 | 40% | Black |
| Example 13 | DMPA | HDI | (2-9) | 15000 | 20 | 0.69 | 40% | Black |
| Example 14 | DMPA | HDI | (2-10) | 15000 | 25 | 0.69 | 40% | Black |
| Example 15 | DMPA | HDI | (2-11) | 15000 | 10 | 0.69 | 40% | Black |
| Example 16 | DMPA | HDI | (2-15) | 15000 | 30 | 0.69 | 40% | Black |
| Example 17 | DMPA | HDI | (2-18) PC T5650 | 15000 | 0 | 0.69 | 40% | Black |
| Example 18 | DMPA | HDI | (2-18) PC T5651 | 15000 | −20 | 0.69 | 40% | Black |
| Example 18-2 | DMPA | HDI | (2-18) PC T5651 | 15000 | −20 | 0.69 | 40% | Black |
| Example 18-3 | DMPA | HDI | (2-18) PC T5651 | 15000 | −20 | 0.69 | 40% | Black |
| Example 19 | DMPA | HDI | (2-18) PC T5652 | 15000 | −40 | 0.69 | 40% | Black |
| Example 20 | DMPA | HDI | (2-18) PCD T3451 | 15000 | −20 | 0.69 | 40% | Black |
| Example 21 | DMPA | HDI | (2-18) PC C1090 | 15000 | −20 | 0.69 | 40% | Black |

TABLE 4-continued

| | | | | | | | | |
|---|---|---|---|---|---|---|---|---|
| Comparative Example 1 | DMPA | HXDI | TCD | 15000 | 125 | 0.69 | 40% | Black |
| Comparative Example 2 | DMPA | IPDI | (2-1) | 15000 | 80 | 0.69 | 40% | Black |

| | Colored Resin Particles | | | | | Evaluation Results | | |
|---|---|---|---|---|---|---|---|---|
| | Oil-soluble Dye or Comparative Coloring Agent | | | Mass | Particle | (PS base material) | | |
| | Type | | Amount | Ratio | Diameter | Optical | Pencil | Adhesive- |
| | Classification | Type | (mass %) | [P/dye] | (nm) | Density | Hardness | ness |
| Example 1 | Chromium complex | SB28 | 60% | 0.67 | 150 | S | HB | 1 |
| Example 2 | Chromium complex | SB28 | 60% | 0.67 | 150 | SS | F | 0 |
| Example 3 | Chromium complex | SB28 | 60% | 0.67 | 150 | SS | F | 0 |
| Example 4 | Chromium complex | SB28 | 60% | 0.67 | 150 | SS | F | 0 |
| Example 5 | Chromium complex | SB28 | 60% | 0.67 | 150 | SS | F | 0 |
| Example 6 | Chromium complex | SB28 | 60% | 0.67 | 150 | SS | F | 0 |
| Example 7 | Chromium complex | SB28 | 60% | 0.67 | 150 | SS | F | 0 |
| Example 8 | Chromium complex | SB28 | 60% | 0.67 | 150 | SS | F | 0 |
| Example 9 | Chromium complex | SB28 | 60% | 0.67 | 150 | SS | F | 0 |
| Example 10 | Chromium complex | SB28 | 60% | 0.67 | 150 | SS | F | 0 |
| Example 11 | Chromium complex | SB28 | 60% | 0.67 | 150 | sss | H | 0 |
| Example 12 | Chromium complex | SB28 | 60% | 0.67 | 150 | SSS | H | 0 |
| Example 13 | Chromium complex | SB28 | 60% | 0.67 | 150 | SSS | H | 0 |
| Example 14 | Chromium complex | SB28 | 60% | 0.67 | 150 | SSS | H | 0 |
| Example 15 | Chromium complex | SB28 | 60% | 0.67 | 150 | SSS | H | 0 |
| Example 16 | Chromium complex | SB28 | 60% | 0.67 | 150 | SSS | H | 0 |
| Example 17 | Chromium complex | SB28 | 60% | 0.67 | 150 | SSS | H | 0 |
| Example 18 | Chromium complex | SB28 | 60% | 0.67 | 150 | SSS | H | 0 |
| Example 18-2 | Chromium complex | SB28 | 60% | 0.67 | 150 | SSS | H | 0 |
| Example 18-3 | Chromium complex | SB28 | 60% | 0.67 | 150 | SSS | H | 0 |
| Example 19 | Chromium complex | SB28 | 60% | 0.67 | 150 | SSS | H | 0 |
| Example 20 | Chromium complex | SB28 | 60% | 0.67 | 150 | SSS | H | 0 |
| Example 21 | Chromium complex | SB28 | 60% | 0.67 | 150 | SSS | H | 0 |
| Comparative Example 1 | Nigrosine iron complex | SB7 | 60% | 0.67 | 150 | A | B | 3 |
| Comparative Example 2 | Nigrosine iron complex | SB7 | 60% | 0.67 | 150 | A | B | 3 |

As shown in Table 4, it has been confirmed that using the inks of Examples 1 to 21, it is possible to form, on a PS base material, an image which is excellent in the optical density, hardness, and adhesiveness to the base material.

The entire disclosure of JP2019-035264 filed on Feb. 28, 2019 is incorporated herein by reference.

All literatures, patent applications, and technical standards described herein are incorporated herein by reference to the same extent as if each literature, patent application, or technical standard is specifically and individually indicated as being incorporated by reference.

What is claimed is:

1. A colored resin particle dispersion comprising:
    colored resin particles; and
    water,
    wherein the colored resin particles contain an oil-soluble dye and a polymer P containing a structural unit represented by Formula (1), a structural unit represented by Formula (2), and a hydrophilic group,

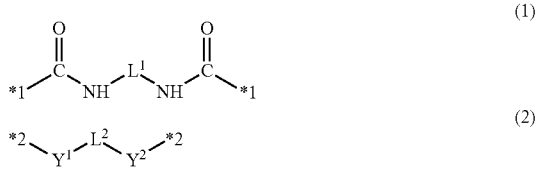

in Formula (1),
$L^1$ represents a chain hydrocarbon group having 4 to 10 carbon atoms, and
two *1's each represent a bonding position, and
in Formula (2),
$L^2$ represents a chain hydrocarbon group having 2 to 25 carbon atoms which may contain an oxygen atom, a nitrogen atom, or a sulfur atom, or a polymer chain having a number-average molecular weight of 500 or greater which consists of a polyether chain, a polyester chain, a polycaprolactone chain, a polycarbonate chain, a polybutadiene chain, a polyisoprene chain, or a polyolefin chain,
$Y^1$ and $Y^2$ each independently represent —O—, —S—, or, —NRz-,
Rz represents a hydrogen atom or a hydrocarbon group having 1 to 20 carbon atoms, and
two *2's each represent a bonding position.

2. The colored resin particle dispersion according to claim 1,
    wherein a glass transition temperature of the polymer P is 50° ° C. or lower.

3. The colored resin particle dispersion according to claim 1,
    wherein $L^2$ is a chain hydrocarbon group having 4 to 25 carbon atoms and a branched structure which may contain an oxygen atom, a nitrogen atom, or a sulfur atom, or a polymer chain having a number-average molecular weight of 500 or greater which consists of a polycarbonate chain.

4. The colored resin particle dispersion according to claim 3,
    wherein the chain hydrocarbon group having 4 to 25 carbon atoms and a branched structure which may contain an oxygen atom, a nitrogen atom, or a sulfur atom is an unsubstituted branched alkylene group having 6 to 25 carbon atoms, an alkoxylated branched alkylene group having 6 to 25 carbon atoms, or an alkylcarbonyloxylated branched alkylene group having 6 to 25 carbon atoms, and
    the polycarbonate chain contains an alkylene group having 2 to 12 carbon atoms and does not contain a cyclic structure.

5. The colored resin particle dispersion according to claim 1,
    wherein $L^1$ is an alkylene group having 6 to 10 carbon atoms.

6. The colored resin particle dispersion according to claim 1,
    wherein the hydrophilic group is at least one selected from the group consisting of a carboxyl group and a salt of the carboxyl group.

7. The colored resin particle dispersion according to claim 6,
    wherein in a case where a total number of millimoles of a carboxyl group contained in 1 g of the polymer P and a salt of the carboxyl group is defined as an acid value of the polymer P, the acid value of the polymer P is 0.30 mmol/g to 1.50 mmol/g.

8. The colored resin particle dispersion according to claim 1,
    wherein a weight-average molecular weight of the polymer P is 8,000 to 30,000.

9. The colored resin particle dispersion according to claim 1,
    wherein the oil-soluble dye contains at least one selected from the group consisting of a metal complex dye and a disazo dye.

10. The colored resin particle dispersion according to claim 1,
    wherein the oil-soluble dye contains at least one selected from the group consisting of a chromium complex dye and a disazo dye.

11. The colored resin particle dispersion according to claim 1,
    wherein the oil-soluble dye contains a chromium complex dye.

12. The colored resin particle dispersion according to claim 1,
    wherein a mass ratio of a content of the polymer P to a content of the oil-soluble dye is 0.10 to 2.50.

13. The colored resin particle dispersion according to claim 1,
    wherein a mass ratio of a content of the polymer P to a content of the oil-soluble dye is 0.25 to 1.00.

14. An ink comprising:
    the colored resin particle dispersion according to claim 1.

15. The ink according to claim 14, which is used as an inkjet ink.

16. The ink according to claim 14, which is used as a printing ink.

17. An ink set comprising:
    two or more types of inks,
    wherein at least one of the two or more types of inks is the ink according to claim 14.

18. An inkjet printing method comprising:
    a step of forming an image by applying the ink according to claim 14 to a fabric by an inkjet method; and
    a step of heat-treating the image.

19. The colored resin particle dispersion according to claim 1,
    wherein the polymer P comprises at least one structural unit having a hydrophilic group, and the structural unit having a hydrophilic group is a structural unit represented by the following Formula (3);

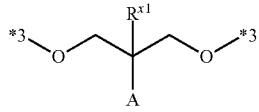
(3)

wherein, in Formula (3), $R^{x1}$ represents a hydrogen atom or an alkyl group having 1 to 10 carbon atoms, A represents an anionic group, and two *3's each represent a bonding position.

20. The colored resin particle dispersion according to claim 1,
wherein the structural unit represented by Formula (1) that is contained in the polymer P is a structural unit that is derived from at least one selected from the group consisting of the following compound (1-1), compound (1-2), and compound (1-3).

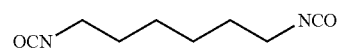
(1-1)

(1-2)

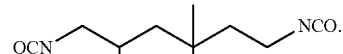
(1-3)

* * * * *